US011897138B2

(12) United States Patent
Tsuboi et al.

(10) Patent No.: US 11,897,138 B2
(45) Date of Patent: Feb. 13, 2024

(54) INJECTION APPARATUS, INJECTION METHOD, AND INJECTION PROGRAM

(71) Applicant: SONY CORPORATION, Tokyo (JP)

(72) Inventors: Toshimitsu Tsuboi, Tokyo (JP); Ryo Terasawa, Tokyo (JP)

(73) Assignee: SONY CORPORATION, Tokyo (JP)

(*) Notice: Subject to any disclaimer, the term of this patent is extended or adjusted under 35 U.S.C. 154(b) by 353 days.

(21) Appl. No.: 17/281,762

(22) PCT Filed: Sep. 30, 2019

(86) PCT No.: PCT/JP2019/038508
§ 371 (c)(1),
(2) Date: Mar. 31, 2021

(87) PCT Pub. No.: WO2020/075554
PCT Pub. Date: Apr. 16, 2020

(65) Prior Publication Data
US 2021/0394363 A1 Dec. 23, 2021

(30) Foreign Application Priority Data
Oct. 12, 2018 (JP) ................. 2018-193689

(51) Int. Cl.
B25J 9/16 (2006.01)
B25J 11/00 (2006.01)
B25J 13/08 (2006.01)

(52) U.S. Cl.
CPC .......... B25J 9/1653 (2013.01); B25J 9/1664 (2013.01); B25J 9/1679 (2013.01); B25J 9/1697 (2013.01); B25J 11/008 (2013.01); B25J 13/085 (2013.01)

(58) Field of Classification Search
None
See application file for complete search history.

(56) References Cited

U.S. PATENT DOCUMENTS

2010/0006599 A1*  1/2010  Cebulski ............... G01F 11/00
                                                    73/204.11
2013/0121880 A1   5/2013  Yamazaki
(Continued)

FOREIGN PATENT DOCUMENTS

EP   3088141 A2 * 11/2016 ............ B25J 11/008
EP   3088141 A2   11/2016
(Continued)

OTHER PUBLICATIONS

Y. Noda and K. Terashima, "Simplified flow rate estimation by decentralization of Kalman filters in automatic pouring robot," 2012 Proceedings of SICE Annual Conference (SICE), Akita, Japan, 2012, pp. 1465-1470. (Year: 2012).*
(Continued)

Primary Examiner — Abby Y Lin
Assistant Examiner — Dylan Brandon Mooney
(74) Attorney, Agent, or Firm — Paratus Law Group, PLLC

(57) ABSTRACT

An apparatus capable of smoothly injecting contents in an object into another object, an injection method, and an injection program. The apparatus includes a robotic arm device configured to grip a first container, and circuitry configured to recognize a flowrate of contents while injecting an amount of the contents from the first container into a second container, and control a tilt of the first container using the robotic arm device to inject the contents into the second container according to the recognized flowrate of the contents.

17 Claims, 14 Drawing Sheets

(56) References Cited

U.S. PATENT DOCUMENTS

| | | | | |
|---|---|---|---|---|
| 2014/0001204 A1* | 1/2014 | Temko | ................ | B67D 3/0054 |
| | | | | 222/23 |
| 2016/0052770 A1* | 2/2016 | Ratti | ..................... | B25J 11/008 |
| | | | | 901/30 |
| 2016/0061708 A1* | 3/2016 | Kravitz | ............... | G01N 29/036 |
| | | | | 73/54.41 |
| 2017/0011442 A1 | 1/2017 | Hu et al. | | |

FOREIGN PATENT DOCUMENTS

| | | |
|---|---|---|
| JP | S626770 A | 1/1987 |
| JP | H06000620 A | 1/1994 |
| JP | 2002-022624 A | 1/2002 |
| WO | WO 2014/167499 A2 | 10/2014 |

OTHER PUBLICATIONS

Elbrechter et al., Discriminating Liquids Using a Robotic Kitchen Assistant, 2015 IEEE/RSJ International Conference on Intelligent Robots and Systems (IROS), Sep. 28-Oct. 2, 2015, pp. 703-708, Hamburg, Germany.

* cited by examiner

| POT | RADIUS [m] | 0.075 |
|---|---|---|
|  | HEIGHT [m] | 0.2 |
|  | WEIGHT [Kg] | 1 |
|  | VOLUME [m³] | 0.003534292 |
|  | AREA OF INJECTION PORT [m²] | 0.0001 |
| GLASS OF 9 OUNCES | RADIUS OF OPENING [m] | 0.036 |
|  | RADIUS OF BOTTOM [m] | 0.025 |
|  | HEIGHT [m] | 0.093 |
|  | VOLUME [m³] | 0.000274735 |
| WATER | DENSITY [Kg/m³] | 1000 |

| WATER IN POT | VOLUME [m³] | 0.0025 |
|---|---|---|
| WATER IN GLASS | WATER DEPTH [m] | 0.01 |
| INJECTION OPERATION | TARGET INJECTION TIME [s] | 10 |
|  | ACCELERATION/ DECELERATION TIME [s] | 1 |

LIQUID LEVEL HEIGHT l

THERMOGRAPHIC IMAGE

REMOVABLE FLOWRATE SENSOR

FLOWMETER

INJECTION APPARATUS, INJECTION METHOD, AND INJECTION PROGRAM

CROSS REFERENCE TO RELATED APPLICATIONS

This application is a National Stage Patent Application of PCT International Patent Application No. PCT/JP2019/038508 filed on Sep. 30, 2019 under 35 U.S.C. § 371, which claims the benefit of Japanese Priority Patent Application JP 2018-193689 filed on Oct. 12, 2018, the entire contents of which are incorporated herein by reference.

TECHNICAL FIELD

The present disclosure relates to an injection apparatus, an injection method, and an injection program.

BACKGROUND ART

There has been advanced the study of causing a robot to perform human works. A robot for injecting a liquid in a container into other receiver is known as an example of such a robot.

CITATION LIST

Patent Literature

PTL 1

JP 2002-22624A

SUMMARY

Technical Problem

It is desirable that an injection apparatus (such as robot) for injecting contents (such as liquid, powder, or grain) in an object into other object smoothly injects contents into other object. However, an environment for the injection operation (such as the shape of a container, the amount of liquid in a container, or the like) is not necessarily the same. It is not easy for the injection apparatus to smoothly inject contents into other object under various operation environments.

Thus, the present disclosure proposes an injection apparatus capable of smoothly injecting contents in an object into other object, an injection method, and an injection program.

Solution to Problem

According to an aspect of the present disclosure, there is provided an apparatus including: a robotic arm device configured to grip a first container; and circuitry configured to recognize a flowrate of contents while injecting an amount of the contents from the first container into a second container, and control a tilt of the first container using the robotic arm device to inject the contents into the second container according to the recognized flowrate of the contents.

According to another aspect of the present disclosure, there is provided a method of controlling a tilt using a robotic arm device, the method including: causing the robotic arm device to grip a first container; recognizing a flowrate of contents while injecting an amount of the contents from the first container into a second container; and controlling a tilt of the first container using the robotic arm device to inject the contents into the second container according to the recognized flowrate of the contents.

According to another aspect of the present disclosure, there is provided a non-transitory computer-readable storage medium having embodied thereon a program, which when executed by a computer causes the computer to execute a method, the method including: causing a robotic arm device to grip a first container; recognizing a flowrate of contents while injecting an amount of the contents from the first container into a second container; and controlling a tilt of the first container using the robotic arm device to inject the contents into the second container according to the recognized flowrate of the contents.

DESCRIPTION OF EMBODIMENTS

Figure 1:
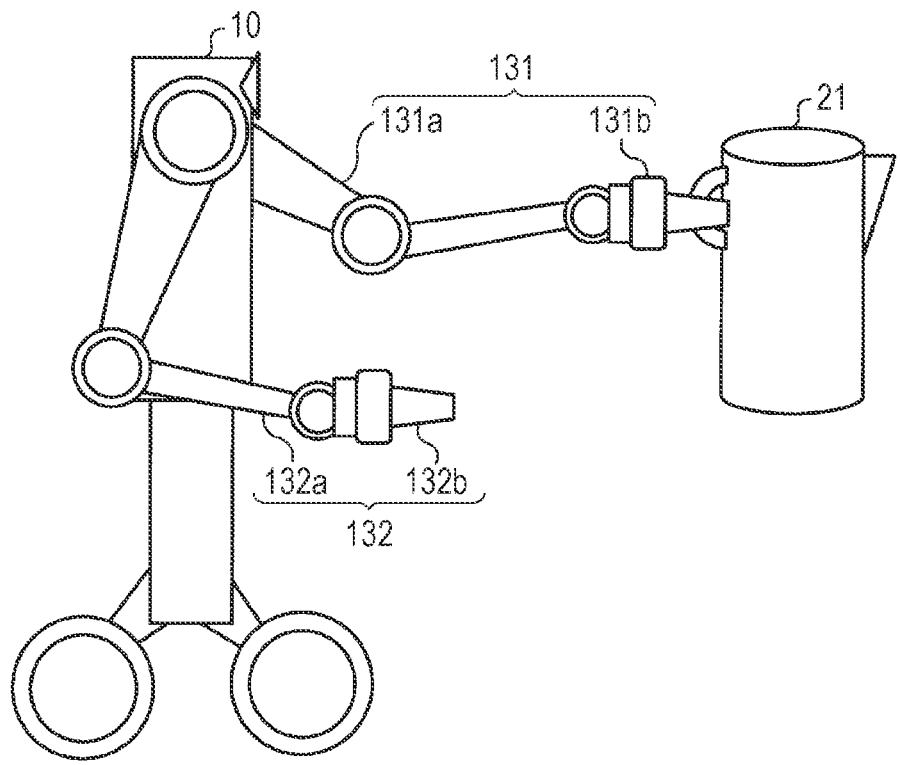
FIG. 1 is a diagram illustrating an injection apparatus gripping a container.

An embodiment of the present disclosure will be described below in detail with reference to the drawings. Additionally, the same parts are denoted with the same reference numerals and a repeated description thereof will be omitted in the following respective embodiments.

The present disclosure will be described in the following item order.

1. Introduction
2. Embodiment
2-1. Configuration of injection apparatus
2-2. Operations of injection apparatus
3. Other embodiment
3-1. Method for estimating liquid level height and tilt amount based on container model
3-2. Method for estimating amount of liquid in container based on container model
3-3. Method for indirectly measuring liquid behavior
3-3-1. Method 1 for estimating viscosity parameter by swinging pot
3-3-2. Method 2 for estimating viscosity parameter by swinging pot
3-3-3. Method 3 for estimating viscosity parameter by swinging pot
3-3-4. Method for indirectly observing amount of liquid in pot by temperature image
3-4. Method for attaching removable flowrate sensor on pot and measuring flowrate
3-5. Method for observing injection port by vision sensor and estimating flowrate
3-6. Method for directly measuring liquid level height
3-7. Method for measuring liquid level height by vision sensor
3-8. Method for changing tilt amount depending on viscosity
3-9. Method for estimating liquid behavior based on learning result
4. Variants
4-1. Method 1 using another arm
4-2. Method 2 using another arm
4-3. Method 3 using another arm
4-4. Method for changing how to inject depending on contents
4-5. Other variant
5. Conclusion

1. INTRODUCTION

An injection apparatus 10 according to an embodiment is capable of smoothly injecting contents (such as liquid, powder, or grain) in an object into other object. An embodiment assumes a robot having an arm capable of gripping an object for the injection apparatus 10. Further, a container such as pot is assumed for an object gripped by the injection apparatus 10. Further, a liquid such as water is assumed for contents in a container. The injection apparatus 10 adjusts the tilt amount of a container gripped by the arm thereby to adjust the amount of liquid to be injected into other object (such as glass, for example).

FIG. 1 is a diagram illustrating the injection apparatus 10 gripping a container 21. The injection apparatus 10 is a robot having two arms (arms 131 and 132). The arm 131 has an arm part 131a and a grip part 131b. The arm 132 includes an arm 132a and a grip part 132b. Each of the arm parts 131a and 132a has joint parts. Each of the grip parts 131b and 132b is capable of gripping a container. In the example of FIG. 1, the injection apparatus 10 grips the container 21 by the grip part 131b of the arm 131.

In the example of FIG. 1, the container 21 (first object) is a pot. Additionally, the container 21 is not limited to a pot, and may be, for example, a kettle, a pitcher, a soy source bottle, a glass, a bowl, a carton (such as milk carton), and the like. Additionally, any object capable of holding liquid, powder, or grain may be employed, and the first object is not limited to a container. A liquid is in the container 21. The liquid is not limited to water, and may be milk, soy source, juice, and the like. Of course, the liquid may be a fuel such as gasoline or heating oil, or may be a test sample (such as chemical agent, for example).

Figure 2:
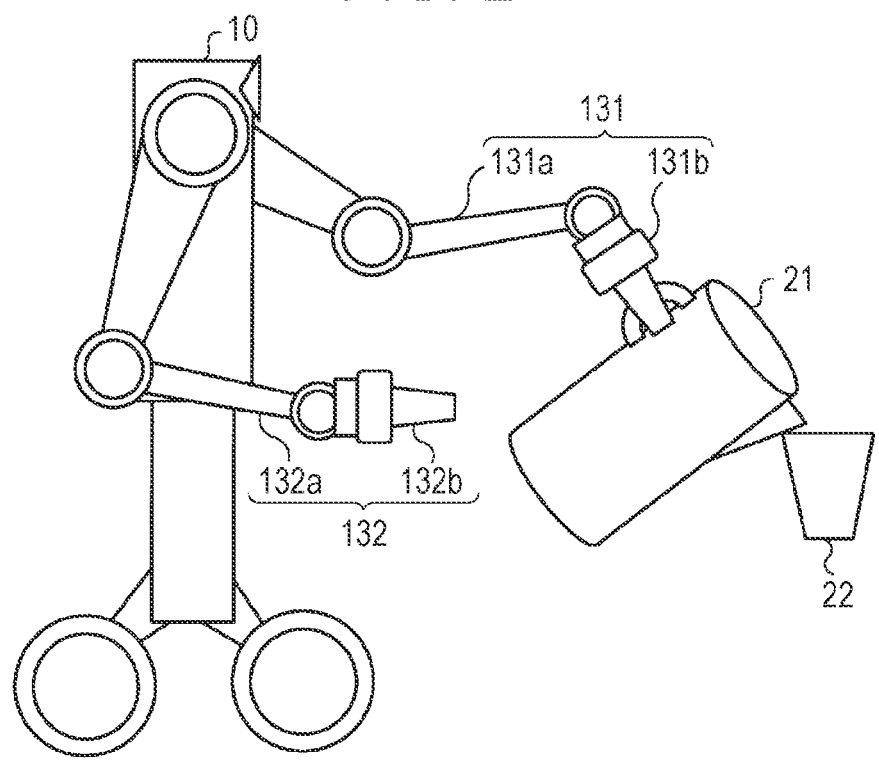
FIG. 2 is a diagram illustrating how the injection apparatus injects a liquid into a container.

FIG. 2 is a diagram illustrating how the injection apparatus 10 injects a liquid into a container 22. The container 22 (second object) is a glass, for example. Of course, the container 22 is not limited to a glass, and may be a pot, a kettle, a pitcher, a soy source bottle, a bowl, a carton, and the like, for example. Of course, the container 22 may be a plant pot including soil or fertilizer. Additionally, any object capable of holding liquid, powder, or grain may be employed, and the second object is not limited to a container. The injection apparatus 10 tilts the container 21 and injects a liquid into the container 22.

A sensor is arranged on each of the arms 131 and 132 in the injection apparatus 10. For example, a six-axis force sensor is arranged at the wrist of the arm 131, and a torque sensor is arranged at each joint part of the arm 131. The injection apparatus 10 measures the weight of the container 21 on the basis of the information from the sensors. The injection apparatus 10 then recognizes the flowrate of the liquid from the container 21 to the container 22 on the basis of a change in weight of the container 21. The injection apparatus 10 adjusts the tilt of the container 21 on the basis of the recognized flowrate thereby to adjust the amount of liquid to be injected. Thereby, the injection apparatus 10 can smoothly inject the liquid in the container 21 into the container 22.

2. EMBODIMENT

The injection apparatus 10 according to an embodiment will be described in detail. The injection apparatus 10 is a robot having two arms (arms 131 and 132), for example. Additionally, the injection apparatus 10 may not necessarily be a robot. The injection apparatus 10 may be an apparatus not in a robot shape such as preparation equipment or experimental apparatus. Further, the injection apparatus 10 may be a device in an apparatus. The number of arms of the injection apparatus 10 is not limited to two. The number of arms of the injection apparatus 10 may be one, or may be two or more. Further, any apparatus having a function of tilting an object such as container may be employed, and the injection apparatus 10 may not necessarily have an arm. In this case, an "arm" described below may be denoted as "object tilt mechanism (container tilt mechanism)" or the like.

2-1. Configuration of Injection Apparatus

Figure 3A:
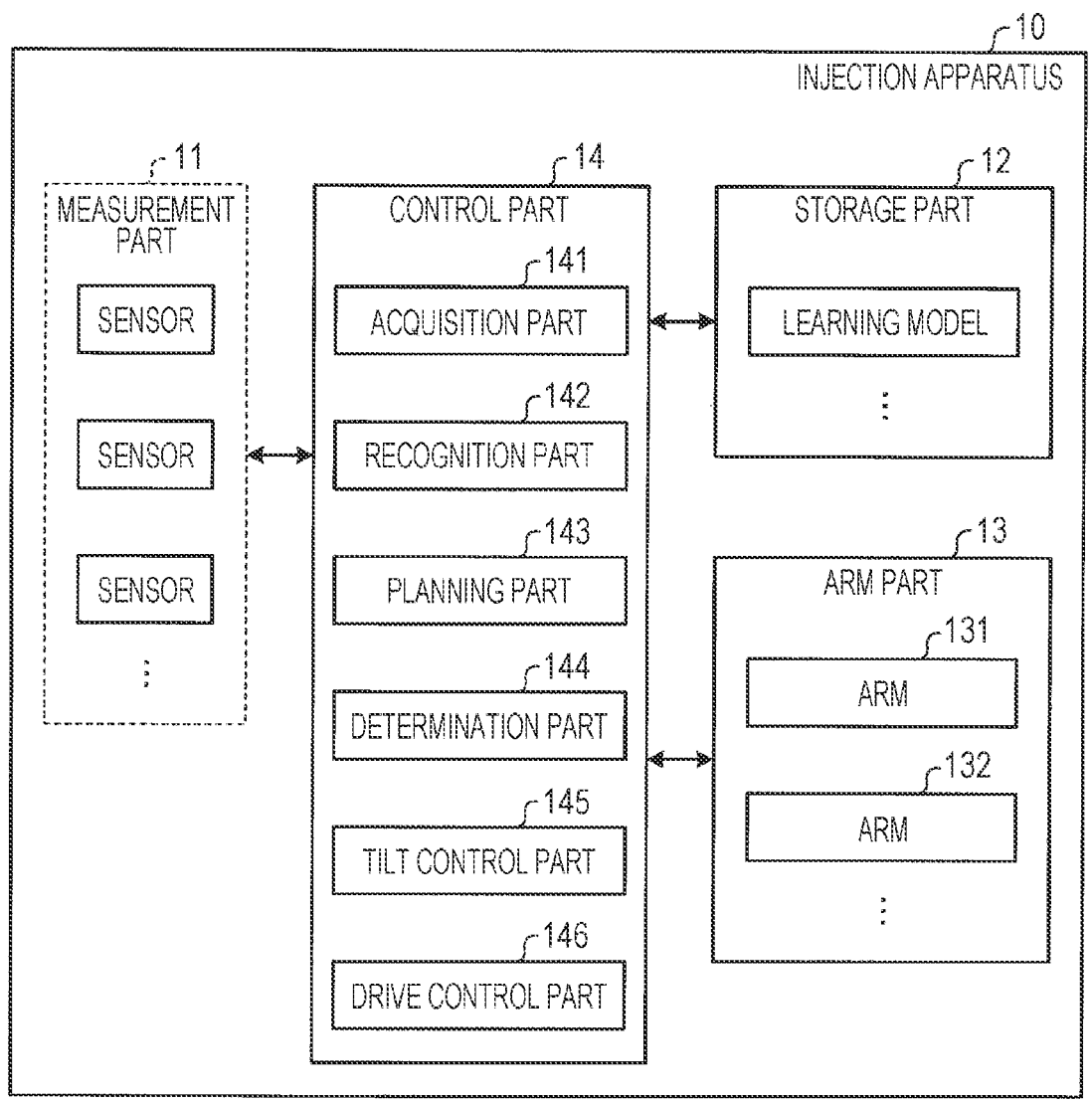
FIG. 3A is a diagram illustrating an exemplary configuration of the injection apparatus according to an embodiment of the present disclosure.

A configuration of the injection apparatus 10 will be first described. FIG. 3A is a diagram illustrating an exemplary configuration of the injection apparatus 10 according to an embodiment of the present disclosure. The injection apparatus 10 includes a measurement part 11, a storage part 12, an arm part 13, and a control part 14. Additionally, the configuration illustrated in FIG. 3A is a functional configuration, and may be different from a hardware configuration. Further, the functions of the injection apparatus 10 may be distributed and mounted in a plurality of physically separated apparatuses.

The measurement part 11 is a measurement apparatus for measuring various states associated with a liquid or powder in a container. For example, the measurement part 11 is a sensor for measuring a state of a liquid or powder in a container. The measurement part 11 may be configured of a plurality of sensors. For example, the measurement part 11 may be configured of the six-axis force sensor arranged at the wrist of the arm 131 or the arm 132, or the torque sensors arranged at the respective joint parts of the arm 131 or the arm 132.

Additionally, the measurement part 11 may be a touch sensor attached on the arm 131 or the arm 132. The touch sensor may be a slip sensor for capturing an object gripping state of the arm 131 or the arm 132, or may be a temperature sensor for capturing the temperature of a gripped object (such as the container 21 or the container 22). Further, the measurement part 11 may include an acceleration sensor for capturing an acceleration (such as vibration) applied to a gripped object. Further, the measurement part 11 may include a sensor for measuring the electric conductivity of a gripped object (such as current sensor for measuring a current applied to the container 21 or the container 22). The sensors of the measurement part 11 may be a water level sensor or a dielectric sensor.

Further, the measurement part 11 may include a sensor for giving visual information to the injection apparatus 10. For example, the measurement part 11 may include a vision sensor for visually capturing the container 21 or the container 22. Further, the measurement part 11 may include a camera for acquiring a thermographic image. Of course, the camera provided in the measurement part 11 may be a typical camera for capturing a visible ray. The vision sensor or the camera may be arranged at a different position from the main body of the injection apparatus 10. Also in this case, the sensors (including the camera) can be regarded as part of the injection apparatus 10.

Further, the measurement part 11 may include a flowrate sensor for capturing the flowrate of a liquid or powder that flowed out from the container 21. The flowrate sensor may be a sensor for capturing the flowrate of a liquid or powder that flowed into the container 22. In this case, the flowrate sensor may be attached on the container 21 or the container 22. Also in this case, the flowrate sensor can be regarded as part of the injection apparatus 10.

The storage part 12 is a data readable/writable storage apparatus such as DRAM, SRAM, flash memory, or hard disc. The storage part 12 functions as a storage device of the injection apparatus 10. The storage part 12 stores information indicating a learning model, for example. The learning model is such that a relationship between observation information of the container 21 and the appropriate tilt amount of the container 21 is smoothly learned, for example. The observation information is measured by the measurement part 11, for example. For example, the observation information is the weight of the container 21. The tilt amount is the appropriate tilt amount of the container 21 for smoothly injecting a liquid into the container 22, for example.

The arm part 13 is directed for gripping or tilting an object such as container. According to an embodiment, the injection apparatus 10 includes the two arms (the arms 131 and 132), for example, but the number of arms of the injection apparatus 10 is not limited to two. As illustrated in FIG. 1, the arm 131 includes the arm part 131a and the grip part 131b. Similarly, the arm 132 includes the arm part 132a and the grip part 132b. The sensors such as the six-axis force sensor or the torque sensors are arranged in each of the arm parts 131a and 132a. Further, the grip parts 131b and 132b can grip an object (such as the containers 21 and 22), respectively. The touch sensor such as slip sensor is attached on each of the grip parts 131b and 132b. The injection apparatus 10 can capture the weight of a gripping object, the acceleration applied to the gripping object, and the like on the basis of the information from the sensors.

The control part 14 is a controller for controlling each part in the injection apparatus 10. The control part 14 is realized by a processor such as central processing unit (CPU) or micro processing unit (MPU), for example. For example, the control part 14 is realized when the processor executes various programs stored in the storage apparatus in the injection apparatus 10 by use of a random access memory (RAM) or the like as a work area. Additionally, the control part 14 may be realized by an integrated circuit such as application specific integrated circuit (ASIC) or field programmable gate array (FPGA). All of CPU, MPU, ASIC, and FPGA may be regarded as controller.

The control part 14 includes an acquisition part 141, a recognition part 142, a planning part 143, a determination part 144, a tilt control part 145, and a drive control part 146 as illustrated in FIG. 3A. The respective blocks (the acquisition part 141 to the drive control part 146) configuring the control part 14 are functional blocks indicating the functions of the control part 14, respectively. The functional blocks may be software blocks or hardware blocks. For example, the functional blocks may be each one software module realized in software (including a microprogram) or one circuit block on a semiconductor chip (die). Of course, each of the functional blocks may be one processor or one integrated circuit. Any functional block configuration method may be employed. Additionally, the control part 14 may be configured in different function unit from the above functional blocks.

Figure 3B:
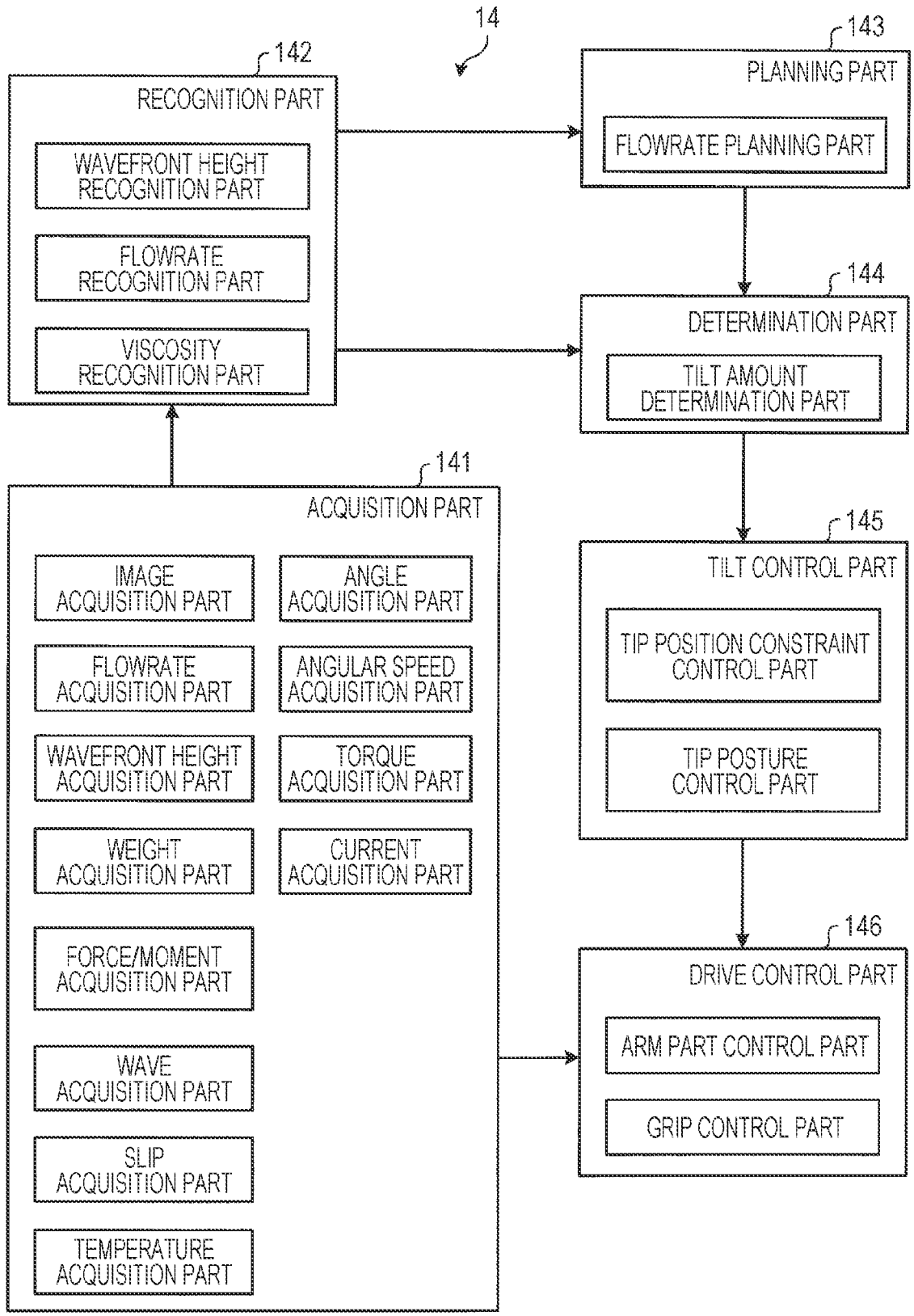
FIG. 3B is a diagram illustrating an exemplary configuration of a control part provided in the injection apparatus.

FIG. 3B is a diagram illustrating an exemplary configuration of the control part 14 provided in the injection apparatus 10.

The acquisition part 141 includes a plurality of acquisition parts for acquiring information from the measurement part 11, the storage part 12, or the like. The acquisition part 141 includes an image acquisition part, a flowrate acquisition part, a wavefront height acquisition part, a weight acquisition part, a force/moment acquisition part, a wave acquisition part, a slip acquisition part, a temperature acquisition part, an angle acquisition part, an angular speed acquisition part, a torque acquisition part, and a current acquisition part, for example. The acquisition parts acquire information from various sensors configuring the measurement part 11, or the storage part 12. Additionally, an "acquisition part" can be replaced with an "input part".

The recognition part 142 includes a plurality of recognition parts for recognizing various states on the basis of the information acquired from the acquisition part 141. The recognition part 142 includes a wavefront height recognition part, a flowrate recognition part, and a viscosity recognition part, for example. The wavefront height recognition part recognizes the wavefront height of a liquid in the container 21. The flowrate recognition part recognizes the flowrate of a liquid injected from the container 21 into the container 22.

The planning part 143 includes a flowrate planning part. The flowrate planning part determines a flowrate plan on the basis of the information (such as flowrate) recognized by the recognition part 142.

The determination part 144 includes a tilt amount determination part. The tilt amount determination part determines the tilt amount of the container 21 on the basis of the information (such as flowrate) recognized by the recognition part 142 and the flowrate plan determined by the planning part 143.

The tilt control part 145 includes a plurality of control parts for controlling the tilt of the container 21 on the basis of the tilt amount determined by the determination part 144. The tilt control part 145 includes a tip position constraint control part and a tip posture control part, for example. The tip position constraint control part controls for constraining a position of the liquid injection port tip of the container 21. The tip posture control part controls a posture of the liquid injection port tip of the container 21.

The drive control part 146 includes a plurality of control parts for driving the arms 131 and 132 under control of the tilt control part 145. The tilt control part 145 includes an arm part control part and a grip control part, for example. The arm part control part controls driving the arm part 131*a* or the arm part 132*a*. The grip control part controls driving the grip part 131*b* and the grip part 132*b*.

Additionally, the operations of the respective blocks (the acquisition part 141 to the drive control part 146) configuring the control part 14 will be described in detail in the following description of injection processing, flowrate control, estimation processing, and the like.

2-2. Operations of Injection Apparatus

The operations of the injection apparatus 10 will be described below.

(Injection Processing)

Figure 4:
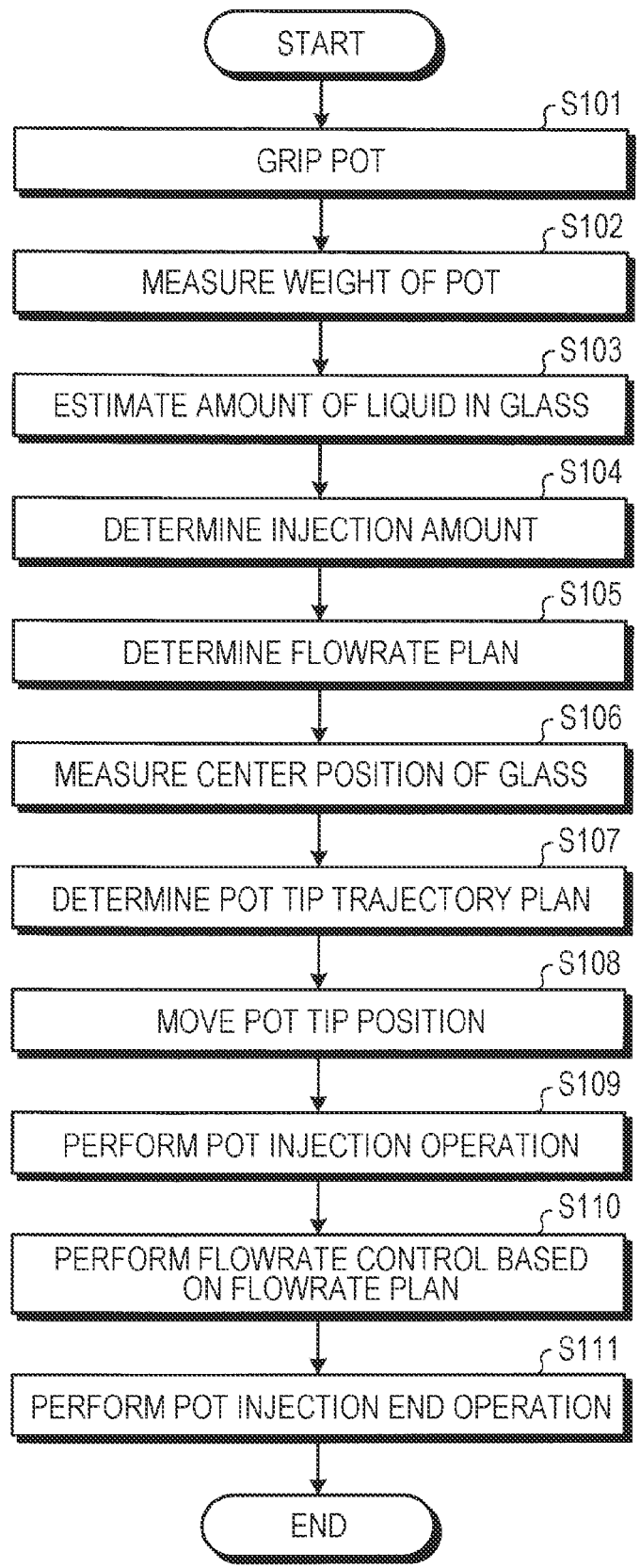
FIG. 4 is a flowchart illustrating an injection processing according to an embodiment of the present disclosure.

FIG. 4 is a flowchart illustrating an injection processing according to an embodiment of the present disclosure. The injection processing is a processing in which the injection apparatus 10 injects a liquid in the container 21 into the container 22. The injection apparatus 10 starts the injection processing when receiving a user instruction. Alternatively, the injection apparatus 10 starts the injection processing when meeting a predetermined condition (when finding a preset container, for example) after powered on.

At first, the injection apparatus 10 grips the container 21 (a pot in the example of FIG. 1) by one arm (step S101). The following description assumes that the injection apparatus 10 grips the container 21 by the arm 131.

The recognition part 142 in the injection apparatus 10 then measures the weight Mp of the container 21 (step S102). At this time, the injection apparatus 10 may measure the weight Mp of the container 21 on the basis of the information from the sensors provided in the measurement part 11. For example, the injection apparatus 10 measures the weight Mp of the container 21 on the basis of the information from the six-axis force sensor arranged at the wrist of the arm 131 or the torque sensors arranged at the respective joint parts of the arm 131.

The recognition part 142 then estimates the amount of liquid remaining in the container 22 (a glass in the example of FIG. 2) into which the liquid is injected (step S103). At this time, the recognition part 142 may estimate the amount of liquid in the container 22 on the basis of the information from the sensors provided in the measurement part 11. For example, the recognition part 142 estimates the amount of liquid in the container 22 on the basis of the information from the vision sensor.

Figure 5:
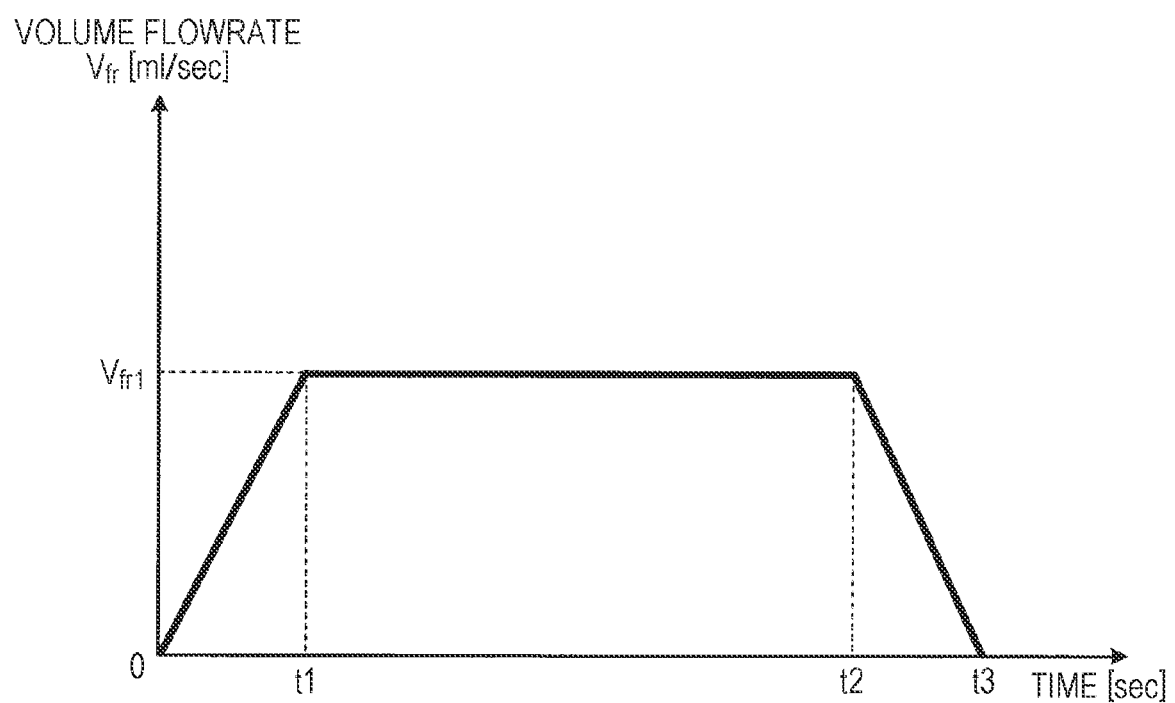
FIG. 5 is a diagram illustrating an exemplary flowrate plan.

Subsequently, the planning part 143 in the injection apparatus 10 determines the amount of liquid to be injected into the container 22 on the basis of the estimated value of the amount of liquid in the container 22 (step S104). The planning part 143 then determines a flowrate plan (step S105). FIG. 5 is a diagram illustrating an exemplary flowrate plan. The vertical axis indicates volume flowrate Vfr and the horizontal axis indicates time. In the example of FIG. 5, the planning part 143 determines a plan in which the flowrate increases until time t1, the flowrate remains constant (volume flowrate Vfr1) until time t2, the flowrate decreases, and then the injection ends at time t3. By way of example, the injection amount is 100 ml, the time t1 is 2 sec, the time t2 is 10 sec, time t3 is 12 sec, and the volume flowrate Vfr1 is 10 ml/sec. The values indicated in the flowrate plan are target values of the flowrate. Additionally, in the example of FIG. 5, the flowrate plan is based on the volume of the liquid, but the flowrate plan may be based on the weight of the liquid.

Subsequently, the recognition part 142 in the injection apparatus 10 measures the center position of the container 22 (such as the center position of the glass) (step S106). The planning part 143 in the injection apparatus 10 then determines a tip trajectory plan of the injection port of the container 21 (such as a pot tip trajectory plan) (step S107). The drive control part 146 in the injection apparatus 10 then moves the tip position of the container 21 according to the tip trajectory plan (step S108).

The injection apparatus 10 then performs an injection operation on the container 21 (step S109). For example, the determination part 144 in the injection apparatus 10 determines the tilt amount of the container 21, and the tilt control part 145 in the injection apparatus 10 performs tilt control of the container 21 on the basis of the determined tilt amount. The drive control part 146 drives the arm 131 under control of the tilt control part 145.

Subsequently, the injection apparatus 10 performs flowrate control on the basis of the flowrate plan (step S110). For example, the injection apparatus 10 assumes the decrease of the weight Mp of the container 21 per unit time (such as 1 second) as the amount of liquid to be injected per unit time. The amount of liquid to be injected per unit time will be denoted as mass flowrate Mfr (g/sec) below. The injection apparatus 10 divides the mass flowrate Mfr by the density of the liquid ρ (g/cm3), and converts the mass flowrate Mfr into the volume flowrate Vfr (ml/sec). Equation (1) is a conversion equation for converting the mass flowrate Mfr into the volume flowrate Vfr.

$$Vfr = Mfr/\rho \tag{1}$$

The injection apparatus 10 adjusts the tilt amount of the container 21 to be at the volume flowrate Vfr according to the flowrate plan. Thereby, the injection apparatus 10 can smoothly inject the liquid into the container 22. Additionally, flowrate control of the injection apparatus 10 will be described below in detail.

When completing the injection of the liquid, the injection apparatus 10 performs an injection end operation (step S111). For example, the injection apparatus 10 returns the container 21 to the original position. The injection apparatus 10 terminates the injection processing when completing the injection end operation.

(Flowrate Control)

Figure 6:
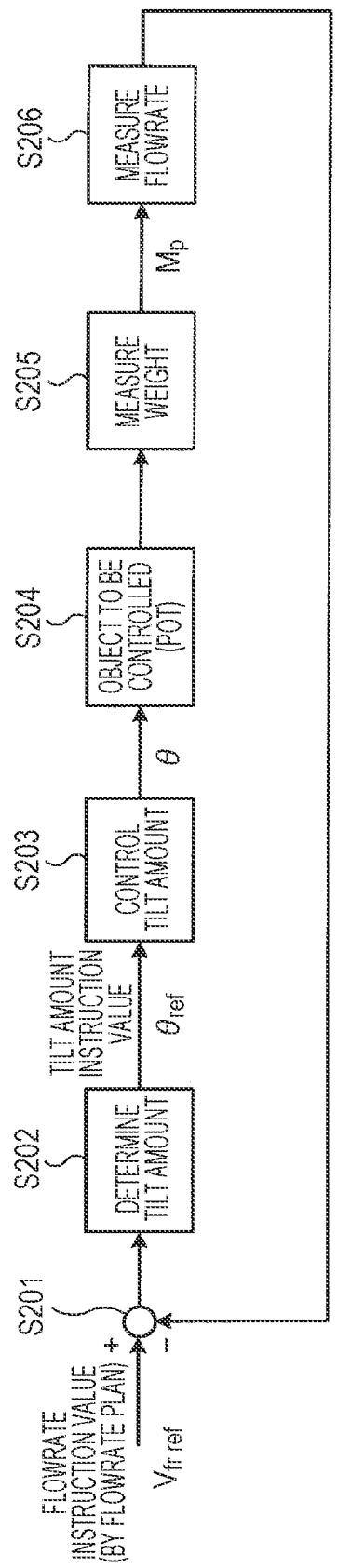
FIG. 6 is a block diagram illustrating flowrate control based on the flowrate plan.

Flowrate control performed by the injection apparatus 10 will be described below. Flowrate control is a processing performed in step S110 in the exemplary injection processing described above. FIG. 6 is a block diagram illustrating flowrate control based on the flowrate plan. In the example of FIG. 6, flowrate control is feedback control assuming the flowrate per unit time as a feedback value. Flowrate control will be described below with reference to FIG. 6.

At first, the determination part 144 in the injection apparatus 10 acquires a flowrate instruction value Vfr ref based on the flowrate plan determined by the planning part 143. The flowrate instruction value Vfr ref is a flowrate target value. In the example of FIG. 5, the flowrate instruction value Vfr ref at time t1 is a volume flowrate Vfr1. Further, the determination part 144 acquires a current volume flowrate Vfr. The volume flowrate Vfr is obtained by mass-converting the amount of liquid to be injected per unit time. The determination part 144 then calculates a difference between the flowrate instruction value Vfr ref and the volume flowrate Vfr (step S201).

The determination part 144 then determines the tilt amount of the container 21 on the basis of the calculated difference (step S202). For example, the determination part 144 determines the tilt amount by proportional control (P control) in which the calculated different is multiplied by a proportional gain, PI control in which the calculated difference is integrated, multiplied by an integral gain, and added to a proportional control term, PID control in which the differential of the calculated difference is multiplied by a differential gain and added to a PI control term, or the like. The tilt amount determined by the determination part 144 is output as a tilt amount instruction value θref to the tilt control part 145.

Subsequently, the tilt control part 145 in the injection apparatus 10 tilts the container 21 on the basis of the tilt amount instruction value θref (step S203). Here, assuming the target tilt amount θ of the tilt control part 145, the drive control part 146 controls the arm 131 to meet the tilt amount θ of the container 21 (step S204).

Subsequently, the recognition part 142 measures the weight Mp of the container 21 on the basis of the information associated with the weight of the container 21 acquired from the acquisition part 141 (such as the information from the six-axis force sensor) (step S205). The recognition part 142 then calculates the volume flowrate Vfr on the basis of a change in the weight Mp (such as the decrease of the weight Mp per unit time) (step S206). The determination part 144 then returns to step S201 to calculate a difference between the flowrate instruction value Vfr ref and the volume flowrate Vfr again (step S201).

Subsequently, the injection apparatus 10 repeatedly performs step S201 to step S206 until completing the injection of the liquid. The injection apparatus 10 can smoothly inject the liquid into the container 22 under feedback control.

3. OTHER EMBODIMENT

An embodiment will be described below.
3-1. Method for Estimating Liquid Level Height/Tilt Amount Based on Container Model In various embodiments (step S109), the determination part 144 in the injection apparatus 10 determines the tilt amount of the container 21. At this time, the method for estimating the initial tilt amount θ of the container 21 may be based on a model of the container 21.

Figure 7:
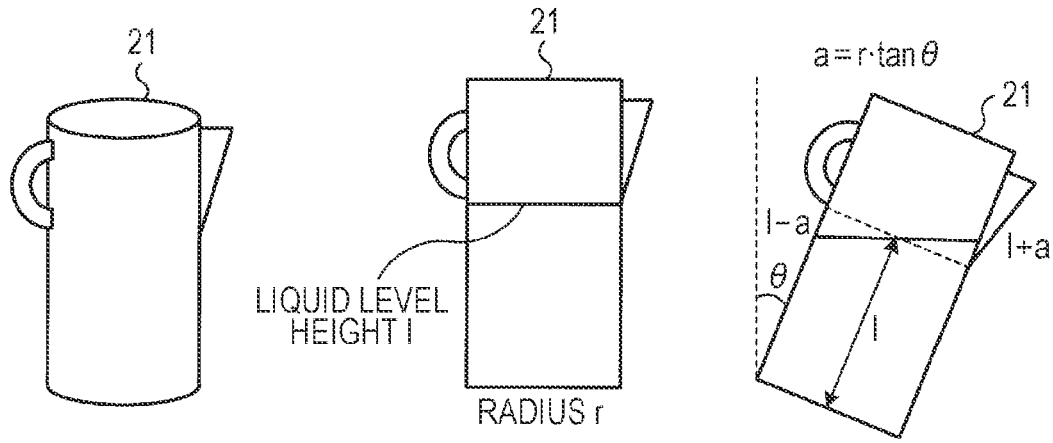
FIG. 7 is a diagram illustrating an exemplary container model.
Figure 8:
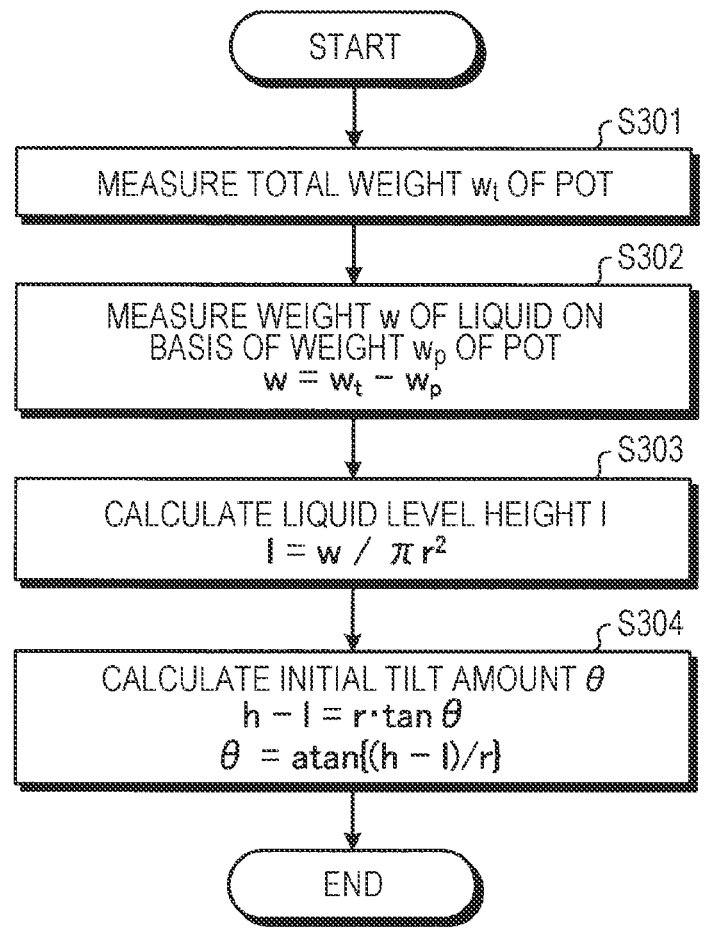
FIG. 8 is a flowchart illustrating an initial tilt amount estimation processing based on the container model.

FIG. 7 is a diagram illustrating an exemplary model of the container 21. In the example of FIG. 7, a cylindrical pot with the weight Wp and the radius r (inner radius of 2*r*) is illustrated as a model of the container 21. The height of the container 21 (distance between the bottom of the pot and the injection port) is denoted as h. The method for determining the initial tilt amount θ of the container 21 will be described below by way of the model of the container 21 illustrated in FIG. 7. FIG. 8 is a flowchart illustrating a processing of estimating the initial tilt amount θ based on the model of the container 21. The estimation processing described below is performed in step S109 in the above estimation processing, for example.

Additionally, the following description assumes that the weight Wp, the radius r, and the height h of the container 21 are known. Further, the weight Wp indicates the weight of the container 21 containing a liquid in the exemplary injection processing described above, but the weight Wp will indicate the weight of the empty container 21 in the following description. Additionally, in the following description, the weight Wp of the empty container 21 may be denoted as pot weight Wp (or container weight Wp).

At first, the determination part 144 measures the total weight Wt of the container 21 (step S301). In the following description, the total weight Wt of the container 21 may be denoted as pot total weight Wt (or container total weight Wp). The pot total weight Wt is the weight of the container 21 including a liquid. In the exemplary injection processing described above, the pot total weight Wt may be the weight of the container 21 measured by the recognition part 142 in the injection apparatus 10 in step S102.

Subsequently, the determination part 144 estimates the liquid weight w on the basis of the pot weight Wp (step S302). The liquid weight w is the weight of the liquid in the container 21. The liquid weight w is calculated in Equation (2), for example. Here, Wt indicates the pot total weight (container total weight) and Wp indicates the pot weight (container weight).

$$w = Wt - Wp \tag{2}$$

Subsequently, the determination part 144 calculates the liquid level height l on the basis of the liquid weight w (step S303). The liquid level height l is the height of the liquid in the container 21 (distance between the center of the bottom inside the container 21 and the center of the level of the liquid in the container 21). The liquid weight w is calculated in Equation (3), for example. Here, r indicates the radius of the container 21.

$$l = w / \pi r^2 \tag{3}$$

Subsequently, the determination part 144 calculates the initial tilt amount θ on the basis of the liquid level height l (step S304). The initial tilt amount θ is a tilt of the container 21 when the liquid in the container 21 reaches the injection port, for example. The distance (h−l) between the liquid level and the injection port is indicated as in Equation (4) on the basis of the initial tilt amount θ. Accordingly, the initial tilt amount θ is calculated in Equation (5), for example. Here, h indicates the height of the container 21 (height of the injection port from the bottom of the pot, for example).

$$h - l = r \cdot \tan \theta \tag{4}$$

$$\theta = \tan\{(h-l)/r\} \tag{5}$$

The determination part 144 calculates the initial tilt amount θ, and then terminates the estimation processing.

In this method, the injection apparatus 10 can determine the initial tilt amount θ with high accuracy, thereby smoothly injecting the contents into the container 22.
3-2. Method for Estimating Amount of Liquid in Container Based on Container Model According to various embodiments (step S103), the Recognition Part 142 in the injection apparatus 10 estimates the amount of liquid in the container 22. At this time, the amount of liquid in the container 22 (volume Vw [m3], for example) may be based on a model of the container 22.

Figure 9:
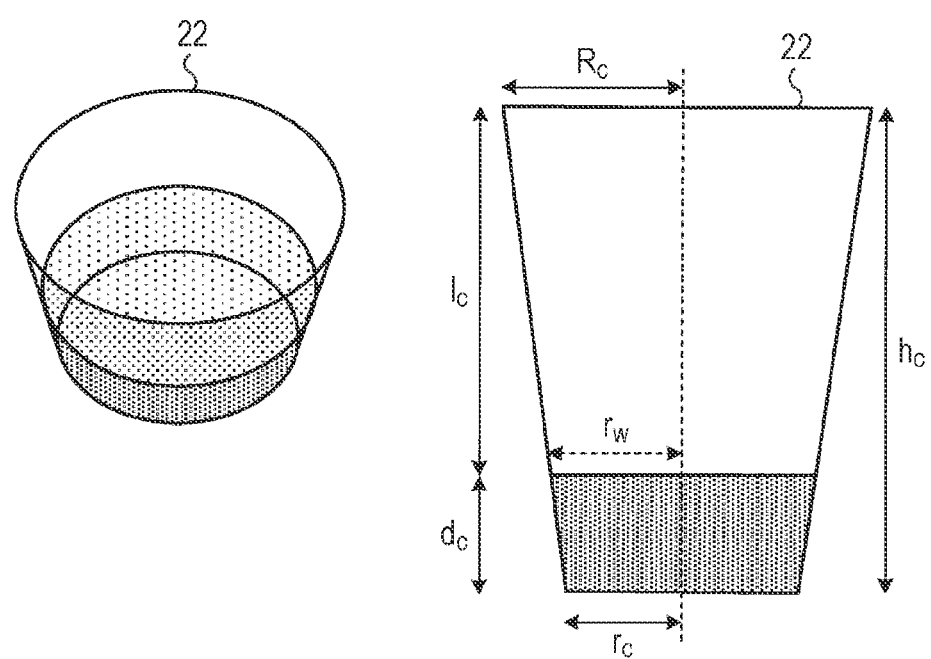
FIG. 9 is a diagram illustrating an exemplary container model.

FIG. 9 is a diagram illustrating an exemplary model of the container 22. The example of FIG. 9 illustrates a glass in a truncated cone shape with the height hc, the radius Rc of the opening, and the radius rc of the bottom as a model of the container 22. A method for estimating the amount of liquid in the container 22 will be described below by way of the model of the container 22 illustrated in FIG. 9. Additionally, the following description assumes that the height hc of the container 22, the radius Rc of the opening, the radius rc of the bottom, and the volume VC of the container are known. Further, in the following description, the recognition part 142 is assumed to estimate the volume Vw of the liquid as the amount of liquid in the container 22, but may estimate the weight of the liquid.

At first, the recognition part 142 measures the height lc of the opening of the container 22 from the liquid level on the basis of the information from the sensors provided in the measurement part 11. For example, the recognition part 142 measures the height lc by a depth image.

The recognition part 142 then estimates the volume Vw of the liquid in the container 22 on the basis of the height lc. For example, the recognition part 142 calculates the depth dc [m] of the liquid in the container 22 in Equation (6). Further, the recognition part 142 calculates the radius rw [m] of the liquid level in the container 22 in Equation (7). The recognition part 142 then calculates the volume Vw [m3] of the liquid in the container 22 in Equation (8).

$$dc = hc - lc \quad (6)$$

$$rw = rc + (Rc \cdot rc)dc/hc \quad (7)$$

$$Vw = \pi dc(rw2 + rwrc + rc2)/3 \quad (8)$$

Additionally, the recognition part 142 may calculate the volume V [m3] of an addable liquid to the container 22 on the basis of the volume Vw of the liquid in the container 22. The volume V of the addable liquid can be calculated in Equation (9), for example.

$$V = VC - VW \quad (9)$$

Further, the planning part 143 in the injection apparatus 10 may calculate the volume flowrate target value Vref on the basis of the volume V of the addable liquid. The volume flowrate target value Vref corresponds to Vfr1 of FIG. 5, for example. The volume flowrate target value Vref can be calculated in Equation (10), for example.

$$Vref = V/(Tt - Ta) \quad (10)$$

Here, Tt indicates the target injection time, and Ta indicates the increase/decrease time (acceleration/deceleration time). In the example of FIG. 5, the target injection time Tt [s] is t3, and the increase/decrease time Ta [s] is t1/2+(t3−t2)/2. Additionally, the acceleration time t1 is the same as the deceleration time (t3−t2) in the example of FIG. 5, but both may take different values, respectively.

Figures 10A, 10B, 10C:
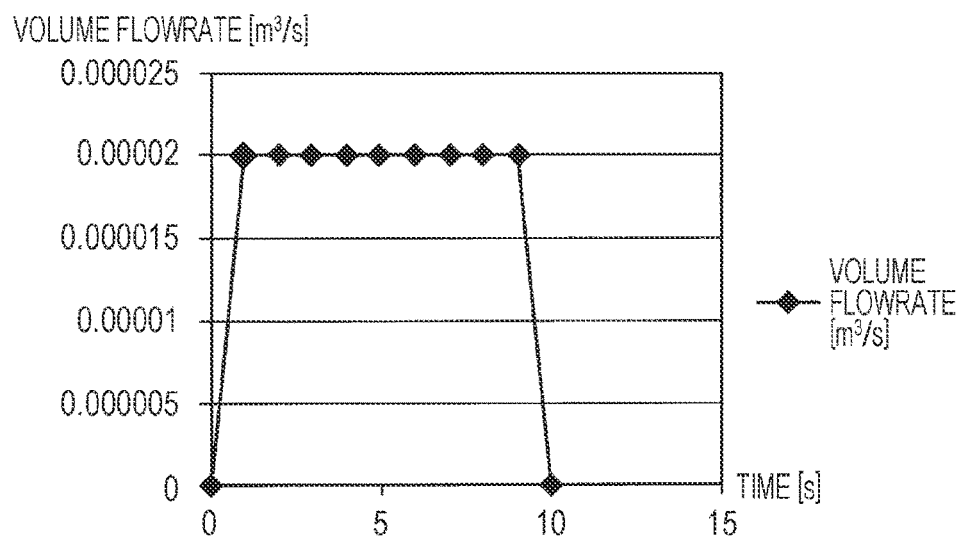
FIG. 10A illustrates specific examples of the values indicating containers and a liquid.
FIG. 10B illustrates specific examples of the volume, the water depth, the target injection time, and the acceleration/deceleration time of the liquid in the example of FIG. 10A.
FIG. 10C is a diagram illustrating specific examples of the volume flowrate target value in the example of FIG. 10B.

FIG. 10A illustrates specific examples of the values indicating the containers 21 and 22 and a liquid. FIG. 10B illustrates specific examples of the volume of the liquid, the water depth, the target injection time, and the acceleration/deceleration time in the example of FIG. 10A. Further, FIG. 10C is a diagram illustrating specific examples of the volume flowrate target value in the example of FIG. 10B.

Figure 11:
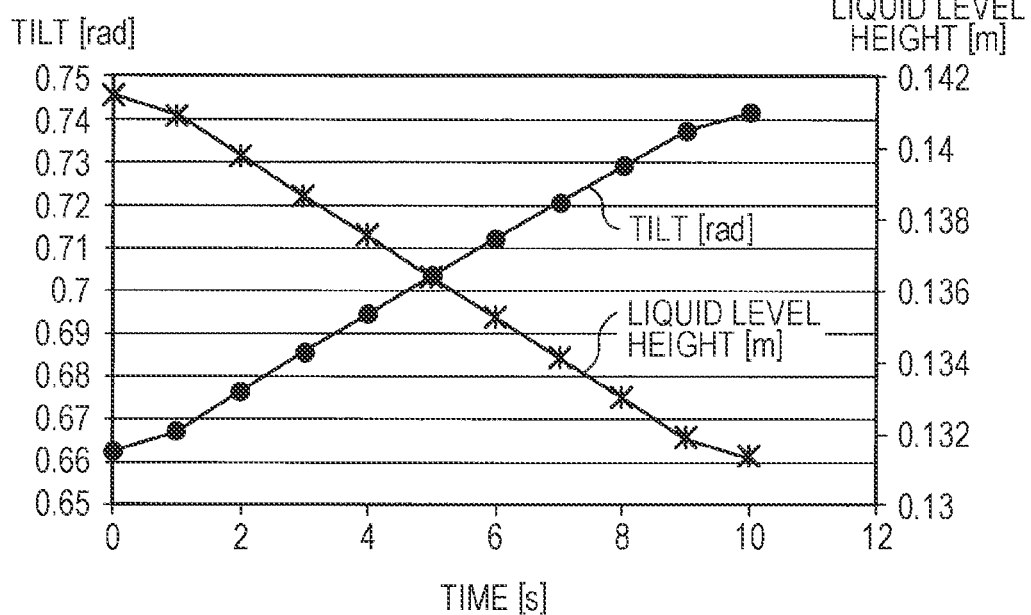
FIG. 11 is a diagram illustrating specific examples of the liquid level height and the tilt amount in the examples of FIG. 10A to FIG. 10C.

The planning part 143 plans the liquid level height [m] by the volume flowrate target value Vref. The planning part 143 then plans the tilt amount [rad] by the planned liquid level height. FIG. 11 is a diagram illustrating specific examples of the liquid level height and the tilt amount in the examples of FIG. 10A to FIG. 10C.

The injection apparatus 10 can recognize the amount of liquid injectable into the container 22 in this method, and thus can inject the contents into the container 22 without spilling the contents.

3-3. Method for Indirectly Measuring Liquid Behavior

The injection apparatus 10 may indirectly measure a behavior of a liquid. For example, the injection apparatus 10 may measure a behavior of a liquid on the basis of the information not from the sensors attached on the containers but from the sensors attached on the arms. A method for indirectly measuring a behavior of a liquid will be described below.

3-3-1. Method 1 for Estimating Viscosity Parameter by Swinging Pot

Viscosity of a liquid to be injected into a container (also denoted as viscosity parameter below) influences the flowrate of the liquid per unit time. It is important to grasp the viscosity parameter of a liquid in a container when the injection apparatus 10 determines the flowrate plan or the tilt amount.

Figure 12:
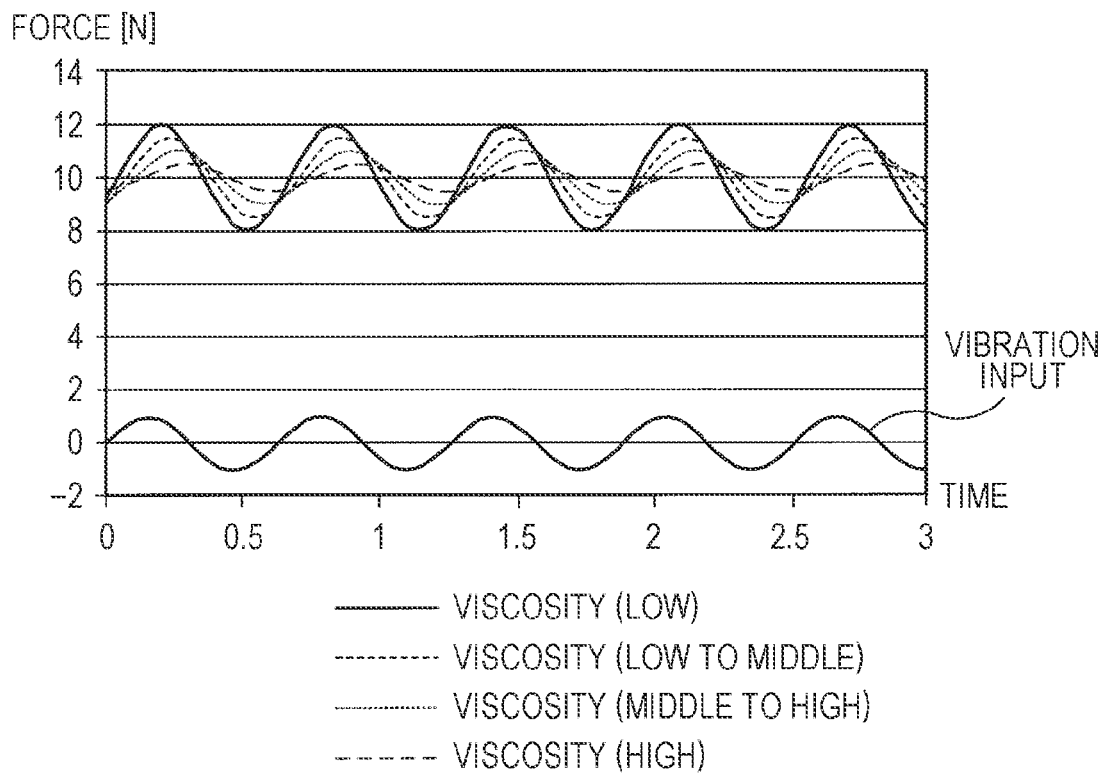
FIG. 12 is a diagram illustrating a detected force when a container including a liquid is vertically swung.

The recognition part 142 in the injection apparatus 10 may estimate the viscosity parameter of the liquid in the container 22 by swinging the container 22 gripped by the arm 131 and confirming a force/moment change by the force sensor (such as the six-axis force sensor) attached on the arm 131. FIG. 12 illustrates that the container (such as pot) containing a liquid is vertically swung and the force at this time is detected. In a case where a liquid is not in the container, the weight of the container is constant when the container is vertically swung. Further, the acceleration can be observed without delay (not illustrated). However, in a case where a liquid is in the container, a phase delay or the like occurs as illustrated in FIG. 12. Specifically, as the liquid has lower viscosity, the amplitude of the force is larger and the phase delay is smaller. As the liquid has higher viscosity, the amplitude of the force is smaller, and the phase delay is larger. The recognition part 142 estimates the viscosity parameter of the liquid in the container 22 on the basis of the amplitude of the force and the phase delay. The injection apparatus 10 can smoothly inject the contents into the container 22 by use of the viscosity parameter.

3-3-2. Method 2 for Estimating Viscosity Parameter by Swinging Pot

The recognition part 142 may estimate the viscosity parameter of the liquid in the container 22 by detecting a vibration by the acceleration sensor. The relationship between the force and the acceleration is a proportional relationship, and is a similar relationship as in 3-3-1 for the liquid in the container 22. The recognition part 142 estimates the viscosity parameter of the liquid in the container 22 on the basis of the amplitude of the acceleration and the phase delay. Also in this method, the injection apparatus 10 can recognize the viscosity of the liquid in the container, thereby smoothly injecting the contents into the container 22.

3-3-3. Method 3 for Estimating Viscosity Parameter by Swinging Pot)

The recognition part 142 may estimate the viscosity parameter of the liquid in the container 22 by swinging the pot and indirectly observing the force, the moment, and the vibration by the slip sensor. The output of the slip sensor is proportional to a shear force, and thus a similar result to the result by the force sensor or the acceleration sensor is obtained. The recognition part 142 estimates the viscosity parameter of the liquid in the container 22 on the basis of the amplitude of the slip sensor and the phase delay. Also in this method, the injection apparatus 10 can recognize the viscosity of the liquid in the container, thereby smoothly injecting the contents into the container 22.

Figure 13:
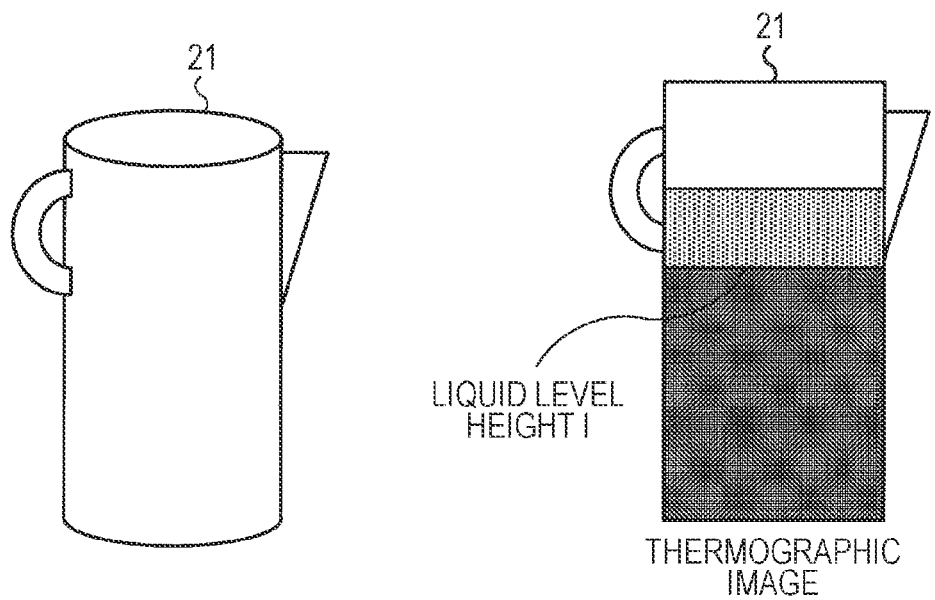
FIG. 13 illustrates an exemplary thermographic image of the container.

3-3-4. Method for Indirectly Observing Amount of Liquid in Pot by Temperature Image The parameters indirectly observed by the recognition part 142 are not limited to the viscosity parameter. The recognition part 142 may indirectly observe the amount of liquid in the container 21 or the container 22. For example, the recognition part 142 observes a change in temperature of the container 21 or the container 22 in a temperature image (thermography). The recognition part 142 then estimates the amount of liquid in the container 21 or the container 22 from the change in temperature of the container 21 or the container 22. FIG. 13 illustrates an exemplary thermographic image of the container 21. In a case where hot tea is in the container 21, for example, a boundary with the high-temperature part can be observed as a thermographic image. The recognition part 142 assumes the boundary as liquid level height 1. Additionally, similarly to the examples of FIGS. 7 and 8, the determination part 144 in the injection apparatus 10 determines the initial tilt amount θ on the basis of the liquid level height 1. In this method, the injection apparatus 10 can recognize the amount of liquid in the container, thereby smoothly injecting the contents into the container 22.

Figure 14:
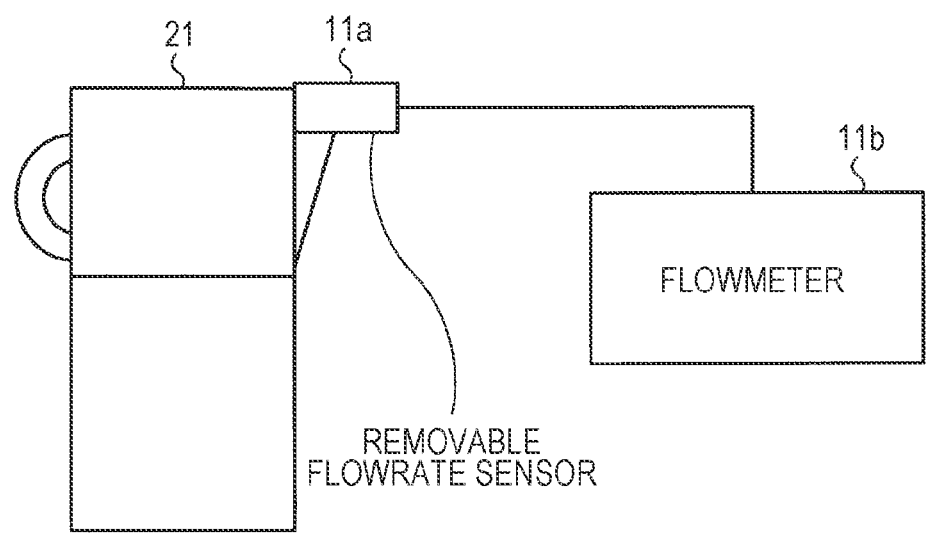
FIG. 14 is a diagram illustrating how a removable flowrate sensor is attached on a robot.

3-4. Method for Attaching Removable Flowrate Sensor on Pot and Measuring Flowrate The injection apparatus 10 may directly measure a behavior of a liquid. For example, the injection apparatus 10 may directly measure the flowrate of a liquid. For example, a removable flowrate sensor is attached on the container 21 in the injection apparatus 10. FIG. 14 is a diagram illustrating how a removable flowrate sensor is attached on a pot. In the example of FIG. 14, a flowrate sensor 11a is attached on the injection port of the container 22. The flowrate sensor 11a is connected to a flowmeter 11b. The flowrate sensor 11a and the flowmeter 11b can be regarded as part of the injection apparatus 10. The flowrate measured by the flowmeter 11b is given in notification to the injection apparatus 10 via a wireless LAN or the like. The flowrate given in notification by the injection apparatus 10 may be acquired as the flowrate described in step S206 in FIG. 6, for example. The injection apparatus 10 determines the tilt amount of the container 21 under the control of FIG. 6, for example, on the basis of the flowrate given in notification. Also in this method, the injection apparatus 10 can recognize the flowrate of the liquid, thereby smoothly injecting the contents into the container 22.

Figure 15:
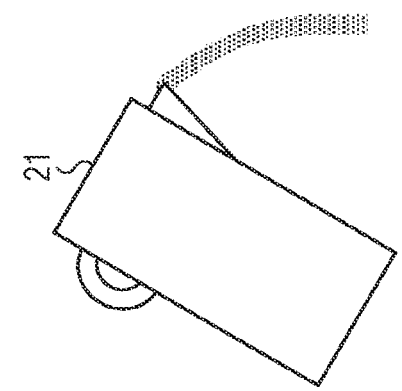
FIG. 15 is a diagram illustrating how a liquid flows out from the outlet of the container by a vision sensor.
Figure 15:
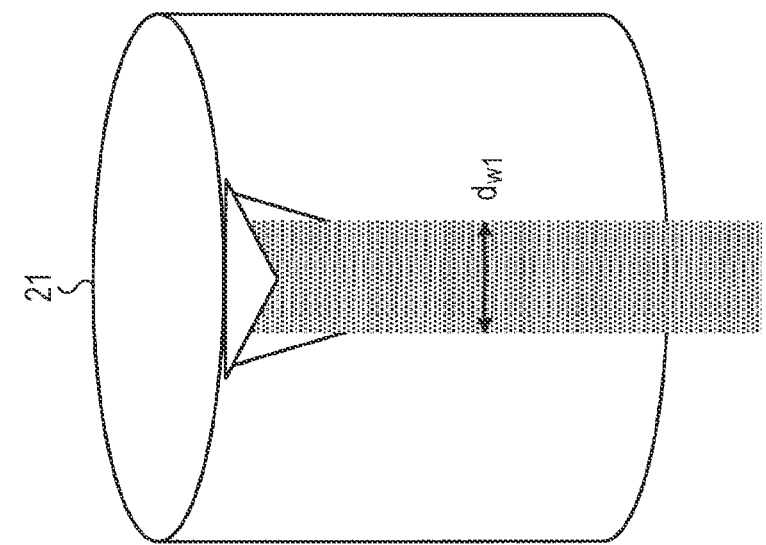
Figure 15:
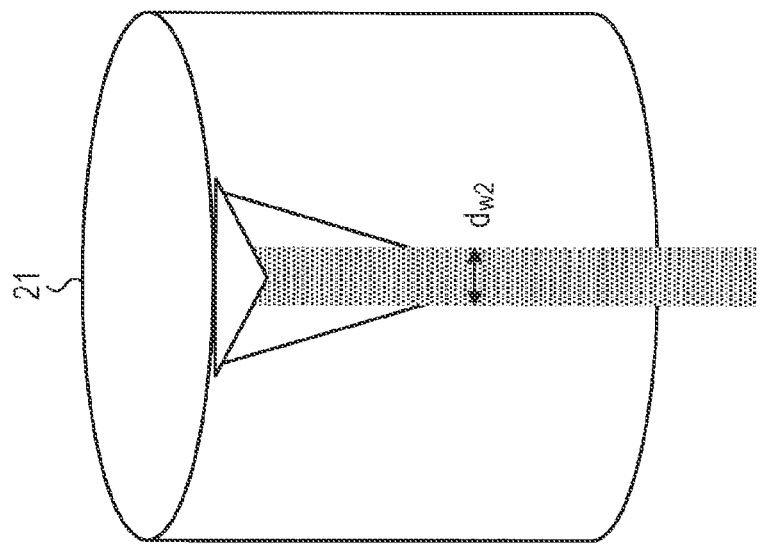

3-5. Method for Observing Injection Port by Vision Sensor and Estimating Flowrate The injection apparatus 10 may measure the flowrate of a liquid by use of the vision sensor. FIG. 15 is a diagram illustrating how a liquid flows out from the outlet of the container 21 by the vision sensor. The flowing liquid is approximated as a column and the width of the flowing liquid is assumed as the diameter dw of the column. The example of FIG. 15 assumes the diameter dw1 of the liquid that flows from the left container 21 and the diameter dw2 of the liquid that flows from the right container 21.

Figure 16:
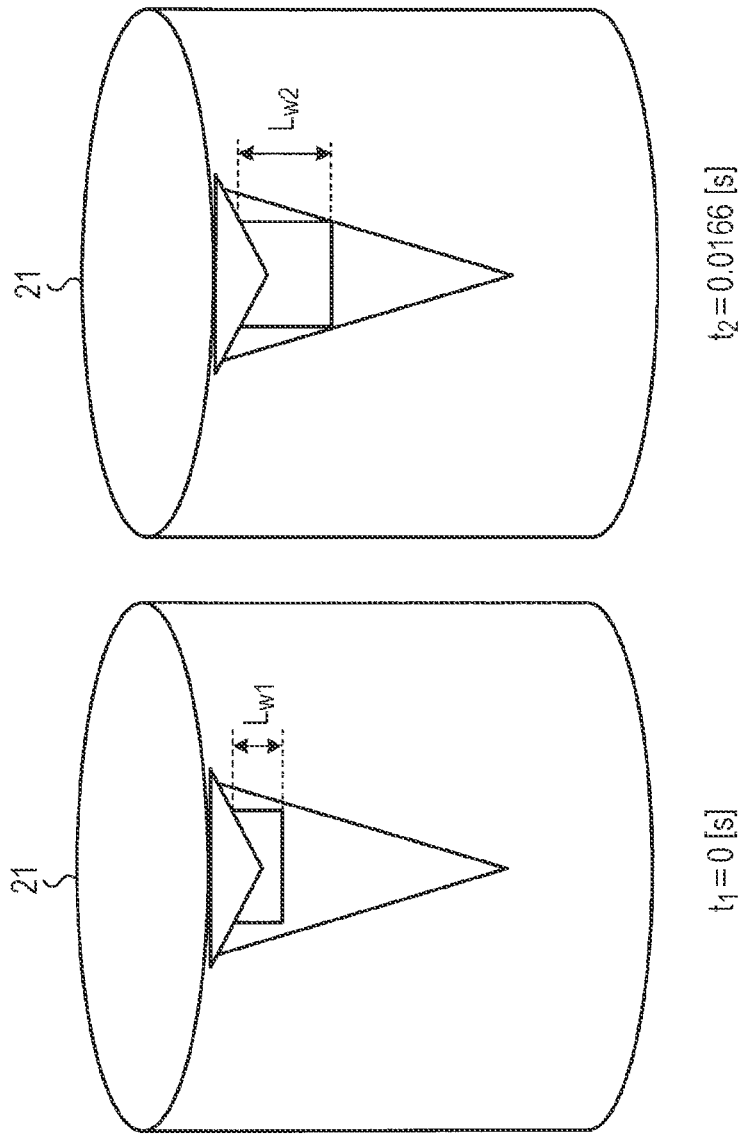
FIG. 16 is a diagram for explaining the flow speed of a liquid at the outlet of the container.

FIG. 16 is a diagram for explaining the flow speed of a liquid at the outlet of the container 21. In the case of the example of FIG. 16, the vision sensor assumes to be at 60 fps. Assuming the time t1=0 (sec) when the liquid starts flowing and the time t2=0.0166 seconds one frame after, the injection apparatus 10 can find the flow speed v of the liquid in the following Equation (11).

$$v=(Lw2-Lw1)/(t2-t1) \quad (11)$$

The injection apparatus 10 can find the volume flowrate V in the following Equation (12) on the basis of the flow speed v and the width dw of the liquid.

$$V=\pi V(dw/2)2 \quad (12)$$

Further, the injection apparatus 10 determines the viscosity coefficient of the liquid in reverse proportion to the flow speed of the liquid. The injection apparatus 10 changes the flowrate plan on the basis of the determined viscosity coefficient, and controls according to the control blocks of FIG. 6. The injection apparatus 10 makes the flowrate estimation in real time, and performs the control illustrated in FIG. 6 assuming the estimated flowrate as the feedback amount. Also in this method, the injection apparatus 10 can recognize the flowrate of the liquid, thereby smoothly injecting the contents into the container 22.

3-6. Method for Directly Measuring Liquid Level Height

The injection apparatus 10 may directly measure the liquid level height of a liquid in the container 21 or the container 22. For example, the injection apparatus 10 may measure the liquid level height of a liquid in the container 21 or the container 22 by use of the water level sensor attached on the container 21 or the container 22. Further, if the container 21 or the container 22 includes a non-dielectric material such as plastic, the injection apparatus 10 may measure the liquid level height of the liquid in the container 21 or the container 22 by the dielectric sensor. Also in this method, the injection apparatus 10 can recognize the liquid level height, thereby smoothly injecting the contents into the container 22.

3-7. Method for Measuring Liquid Level Height by Vision Sensor

Figure 17:
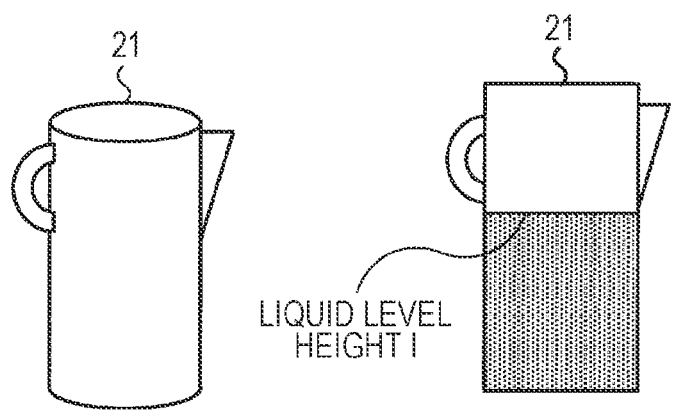
FIG. 17 is a diagram illustrating how the vision sensor measures the liquid level height.

In a case where the container 21 or the container 22 includes a transparent material, the injection apparatus 10 can observe the contents in the container 21 or the container 22 by use of the vision sensor. In this case, the injection apparatus 10 measures the liquid level height of the liquid in the container 21 or the container 22 by the vision sensor. FIG. 17 is a diagram illustrating how the liquid level height is measured by the vision sensor. Also in this method, the injection apparatus 10 can recognize the liquid level height, thereby smoothly injecting the contents into the container 22.

3-8. Method for Changing Tilt Amount Depending on Viscosity

The injection apparatus 10 may change the tilt amount of the container 21 depending on the viscosity of a liquid in the container 21. The motion equation of a machine vibration system is typically expressed in the following Equation (13). Here, M indicates the mass, n indicates the viscosity coefficient, k indicates the stiffness, and f indicates the external force.

[Math. 1]

Further, the flowrate Q in a pipe is typically expressed in the following Equation (14). Here, n indicates the viscosity coefficient, a indicates the radius of the pipe, ΔP indicates the difference in pressure, and L indicates the length of the pipe.

$$Q=(\pi a4\Delta P)/(8\eta L) \quad (14)$$

The flowrate Q is in reverse proportion to the viscosity coefficient as indicated in Equation (14). Thus, the injection apparatus 10 makes a flowrate plan in reverse proportion to the estimated value of the viscosity coefficient n with reference to the viscosity coefficient n of water. Since when the viscosity coefficient n is double, the flowrate per unit time is halved, the injection apparatus 10 doubles the time of the flowrate plan thereby to make the plan. The injection apparatus 10 determines the tilt amount of the container 21 on the basis of the plan. Thereby, the injection apparatus 10 can smoothly inject the contents into the container 22 according to the nature of the contents.

3-9. Method for Estimating Liquid Behavior Based on Learning Result

The injection apparatus 10 may estimate a liquid behavior on the basis of a learning result of a learning model. The learning model can use a model in any structure such as regression model or neural network. The learning model is a model in which the relationship between the observation information of the container 21 or the container 22 and the tilt amount of the container 21 is learned. The learning model is a model in which when the following input data is input, the following output data is output. A learning apparatus for learning (the injection apparatus 10 or other apparatus) sets a connection coefficient of the learning model by use of a method such as back propagation on the basis of the I/O data for learning, for example.

(Input Data)
Weight of total pot
Force/moment by six-axis force sensor
Vibration by acceleration sensor
Slip amount by slip sensor
Temperature image of pot by temperature image (thermography)
Flowrate sensor
Flowrate of liquid at outlet measured by vision sensor (width of liquid image)
Liquid level height by water level sensor
Liquid level height by dielectric sensor
Liquid level height obtained by vision sensor
(Output Data)
Tilt amount
Joint angle of robot capable of generating tilt amount
Flowrate The determination part 144 in the injection apparatus 10 determines the tilt amount of the container 21 on the basis of the output data obtained by inputting the information (observation information) from the sensors provided in the measurement part 11 into the learning model. Thereby, the injection apparatus 10 can smoothly inject the contents into the container 22 by use of various items of data.

4. VARIANTS

4-1. Method 1 Using Another Arm

As described above, the injection apparatus 10 includes a plurality of arms. The injection apparatus 10 grips the container 22 into which a liquid is injected by the different arm 132 from the arm gripping the container 21. The acquisition part 141 in the injection apparatus 10 then acquires the information associated with the weight of the container 22 from the sensors provided in the measurement part 11 (such as the six-axis force sensor arranged at the wrist of the arm 132 or the torque sensors arranged at the respective joints of the arm 132). The recognition part 142 then measures the weight Mp of the container 22 on the basis of the information associated with the weight of the container 22 acquired by the acquisition part 141. The recognition part 142 then calculates the volume flowrate on the basis of a change in weight of the container 22 (such as the increase of the weight Mp per unit time). Also in this method, the injection apparatus 10 can grasp the flowrate of the liquid, thereby smoothly injecting the contents into the container 22.

4-2. Method 2 Using Another Arm

Further, the injection apparatus 10 may grip the container 22 into which a liquid is injected by the different arm 132 from the arm gripping the container 21. Then, the injection apparatus 10 may measure the container 21 or 22 by the vision sensor, and may move the container 21 or the container 22 such that the injection port of the container 21 is at the center of the opening of the container 22 in a case where the injection port of the container 21 is at the edge of the container 22. At this time, the injection apparatus 10 may move the container 21. Further, if the different arm 132 from the arm gripping the container 21 grips the container 22, the arm 132 is controlled thereby to place the injection port of the container 21 at the center of the opening of the container 22. Thereby, the injection apparatus 10 can accurately inject the contents into the container 22 without spilling the contents.

4-3. Method 3 Using Another Arm

Further, in a case where the container 21 has a lid, the injection apparatus 10 may hold the lid of the container 21 by the different arm 132 from the arm gripping the container 21 in order to prevent the lid of the container 21 from dropping when the container 21 is tilted. Thereby, the injection apparatus 10 can inject the contents into the container 22 without dropping the lid.

4-4. Method for Changing how to Inject Depending on Contents

Various embodiments assume that an object to be injected into the container 22 (contents in the container 21) is a liquid, but an object to be injected into the container 22 may be powder or grain. The powder may be salt, sugar, pepper, flour, and the like, for example. The grain may be rice, soy, corn, and the like, for example. Of course, the powder or the grain is not limited thereto. For example, the powder or the grain may be sand or stones. In a case where an object to be injected (contents in the container 21) is powder or grain, the description "liquid" in various embodiments is replaced with "powder" or "grain". Further, in a case where an object to be injected (contents in the container 21) is powder or grain, the description "liquid level" in various embodiments is replaced with "powder level" or "grain level". Additionally, the kinds of the contents are not limited to liquid, powder, and grain. The contents may be an object other than liquid, powder, and grain, such as a gel object. Also in this case, the description "liquid level" in various embodiments is replaced with other description (such as gel level, for example) as needed. Additionally, liquid level, powder level, grain level, gel level, and the like can be collectively denoted as "surface". Further, liquid level height, powder level height, grain level height, gel level height, and the like can be collectively denoted as "surface height". The descriptions "liquid level" and "liquid level height" in various embodiments may be replaced with "surface" and "surface height", respectively, as needed.

The injection apparatus 10 may determine how to inject the contents of the container 21 (the tilt amount of the container 21, for example) on the basis of the kind of the contents in the container 21. For example, the injection apparatus 10 may determine whether the contents in the container 21 are liquid, powder, or grain while viewing the container 22 by a sensor such as the vision sensor. Then, the injection apparatus 10 may change the way to inject the contents of the container 21 depending on whether the contents of the container 21 are liquid, powder, or grain. For example, the injection apparatus 10 may change the tilt amount of the container 21 depending on whether the contents of the container 21 are liquid, powder, or grain. Further, the injection apparatus 10 may change the target injection time or the acceleration/deceleration time depending on whether the contents of the container 21 are liquid, powder, or grain. The contents can be smoothly injected into the container 22 according to the kind of the contents.

Further, the injection apparatus 10 may determine whether the contents of the container 21 are powder or liquid while viewing the container 22 by a sensor such as the vision sensor. Then, the injection apparatus 10 may change the way to inject the contents of the container 21 depending on whether the contents of the container 21 are powder or liquid. For example, the injection apparatus 10 may change the tilt amount of the container 21 depending on whether the contents of the container 21 are liquid or powder. Further, the injection apparatus 10 may change the target injection time or the acceleration/deceleration time depending on whether the contents of the container 21 are liquid or powder. The contents can be smoothly injected into the container 22 according to the kind of the contents.

Further, the injection apparatus 10 may determine whether the contents of the container 21 are grain or liquid while viewing the container 22 by a sensor such as the vision sensor. Then, the injection apparatus 10 may change the way to inject the contents of the container 21 depending on whether the contents of the container 21 are grain or liquid. For example, the injection apparatus 10 may change the tilt amount of the container 21 depending on whether the contents of the container 21 are liquid or grain. Further, the injection apparatus 10 may change the target injection time or the acceleration/deceleration time depending on whether the contents of the container 21 are liquid or grain. The contents can be smoothly injected into the container 22 according to the kind of the contents.

Further, the injection apparatus 10 may determine whether the contents of the container 21 are grain or powder while viewing the container 22 by a sensor such as the vision sensor. Then, the injection apparatus 10 may change the way to inject the contents of the container 21 depending on whether the contents of the container 21 are grain or powder. For example, the injection apparatus 10 may change the tilt amount of the container 21 depending on whether the contents of the container 21 are powder or grain. Further, the injection apparatus 10 may change the target injection time or the acceleration/deceleration time depending on whether the contents of the container 21 are powder or grain. The contents can be smoothly injected into the container 22 according to the kind of the contents.

Of course, the injection apparatus 10 may change the way to inject the contents of the container 21 depending on whether the contents of the container 21 are grain, powder, or liquid. The injection apparatus 10 can smoothly inject the contents into the container 22 according to the kind of the contents of the container 21. The target injection time or the acceleration/deceleration time may be changed depending on whether the contents of the container 21 are grain, powder, or liquid.

4-5. Other Variant

The control apparatus for controlling the injection apparatus 10 according to an embodiment may be realized by a dedicated computer system or may be realized by a general-purpose computer system.

For example, the communication programs for performing the above operations (such as the injection processing, the flowrate control, and the estimation processing) are stored in a computer readable recording medium such as optical disc, semiconductor memory, magnetic tape, or flexible disc to be distributed. Then, the programs are installed in a computer and the above processings are performed thereby to configure the control apparatus, for example. At this time, the control apparatus may be an apparatus (such as personal compute) outside the injection apparatus 10 or may be an apparatus (such as the control part 14) inside the injection apparatus 10.

Further, the communication programs may be stored in a disc apparatus provided in a server apparatus on a network such as the Internet, and downloaded into a computer, for example. Further, the above functions may be realized in cooperation of the operating system (OS) and application software. In this case, the parts other than the OS may be stored and distributed in a medium, or the parts other than the OS may be stored in a server apparatus and downloaded into a computer, for example.

Further, all or some of the processings, which are described as automatically performed ones, among the respective processings described in various embodiments may be manually performed, or all or some of the processings described as manually performed ones may be automatically performed in a well-known method. Additionally, the information including the processing procedures, the specific names, various items of data, or the parameters, which is described in the above description or the drawings, may be arbitrarily changed unless otherwise stated. For example, various items of information illustrated in each Figure are not limited to the illustrated information.

Further, each illustrated component in each apparatus is functional and conceptual, and may not necessarily be physically configured as illustrated. That is, the specific forms such as distribution and integration of the respective apparatuses are not limited to the illustrated ones, and all or some of the apparatuses may be functionally or physically distributed/integrated in any unit depending on various loads or use situations.

Further, various embodiments can be combined as needed when the processing contents are not incompatible. Further, the order of the respective steps illustrated in the sequence diagrams or the flowcharts of various embodiments can be changed as needed.

5. CONCLUSION

As described above, according to embodiments of the present disclosure, the injection apparatus 10 recognizes the flowrate of contents to be injected from the container 21 into the container 22 by tilting the container 21 including the liquid, powder, or grain contents. The injection apparatus 10 then determines (adjusts) the tilt amount of the container 21 on the basis of the recognized flowrate. Thereby, the injection apparatus 10 can smoothly inject the liquid or powder in the container 21 into the other container 22.

Embodiments according to the present disclosure have been described above, but the technical scope of the present disclosure is not limited to each of the embodiments described above, and various modifications can be made without departing from the spirit of the present disclosure. Further, the components according to different embodiments and variants may be combined as needed.

Further, the effects of each embodiment described in the present specification are merely exemplary and are not restrictive, and other effect may be obtained.

Additionally, the present technology can take the following configurations.

(1)

An injection apparatus including:
- a recognition part configured to recognize a flowrate of contents injected from a first object into a second object by tilting the first object containing the contents;
- a determination part configured to determine the tilt amount of the first object on the basis of the recognized flowrate; and
- a tilt control part configured to perform tilt control on the first object on the basis of the determined tilt amount.

(2)

The injection apparatus according to (1), which repeatedly performs the recognition of a flowrate by the recognition part, the determination of the tilt amount by the determination part, and the tilt control by the tilt control part.

(3)

The injection apparatus according to (1) or (2), further including:

a planning part configured to determine a target value of a flowrate of the contents from the first object into the second object, in which the determination part determines the tilt amount of the first object on the basis of a difference between the target value determined by the planning part and the flowrate recognized by the recognition part.

(4)

The injection apparatus according to any one of (1) to (3), further including:

an acquisition part configured to acquire information indicating the weight of the first object, in which the recognition part calculates a flowrate of the contents from the first object into the second object on the basis of a change in weight of the first object.

(5)

The injection apparatus according to any one of (1) to (4), further including:

an acquisition part configured to acquire information indicating the weight of the second object, in which the recognition part calculates a flowrate of the contents from the first object into the second object on the basis of a change in weight of the second object.

(6)

The injection apparatus according to any one of (1) to (5), in which a flowrate sensor is attached on the first object, and the recognition part calculates a flowrate of the contents from the first object into the second object on the basis of information from the flowrate sensor.

(7)

The injection apparatus according to any one of (1) to (6), further including:

an acquisition part configured to acquire information from a vision sensor for observing an injection port of the first object, in which the recognition part calculates a flowrate of the contents from the first object into the second object on the basis of information from the vision sensor.

(8)

The injection apparatus according to any one of (1) to (7), in which the recognition part recognizes a surface height of the contents in the first object, and the determination part determines the initial tilt amount of the first object on the basis of the surface height recognized by the recognition part.

(9)

The injection apparatus according to any one of (1) to (8), further including:

an acquisition part configured to acquire a temperature image of the first object, in which the recognition part recognizes the surface height on the basis of the temperature image.

(10)

The injection apparatus according to any one of (1) to (9), in which a water level sensor or a dielectric sensor is attached on the second object, and the recognition part recognizes the surface height on the basis of information from the water level sensor or the dielectric sensor.

(11)

The injection apparatus according to any one of (1) to (10), further including:

an acquisition part configured to acquire information from a vision sensor for observing the first object, in which the recognition part recognizes the surface height on the basis of information from the vision sensor.

(12)

The injection apparatus according to any one of (1) to (11), in which the recognition part recognizes viscosity of the contents in the first object, and the determination part determines the tilt amount of the first object on the basis of viscosity of the contents in the first object.

(13)

The injection apparatus according to any one of (1) to (12), further including:

an acquisition part configured to acquire information indicating a force from a force sensor attached on an arm gripping the first object, in which the recognition part recognizes viscosity of the contents on the basis of the information indicating a force when the first object is swung.

(14)

The injection apparatus according to any one of (1) to (13), further including:

an acquisition part configured to acquire acceleration information from an acceleration sensor attached on an arm gripping the first object, in which the recognition part recognizes viscosity of the contents on the basis of the acceleration information when the first object is swung.

(15)

The injection apparatus according to any one of (1) to (14), further including:

an acquisition part configured to acquire slip information from a slip sensor attached on an arm gripping the first object, in which the recognition part recognizes viscosity of the contents on the basis of the slip information when the first object is swung.

(16)

The injection apparatus according to any one of (1) to (15), further including:

an acquisition part configured to acquire information indicating a learning model in which a relationship between observation information indicating the first object or the second object and the tilt amount of the first object is learned, in which the determination part determines the tilt amount of the first object by inputting information from a sensor for observing the first object or the second object into the learning model.

(17)

The injection apparatus according to any one of (1) to (16), in which the recognition part recognizes the kind of contents in the first object, and the determination part determines the tilt amount of the first object on the basis of the kind of contents in the first object.

(18)

The injection apparatus according to any one of (1) to (17), in which the recognition part recognizes whether a liquid, powder, or grain is in the first object, and the determination part determines the tilt amount of the first object on the basis of whether a liquid, powder, or grain is in the first object.

(19)
The injection apparatus according to any one of (1) to (18),
in which the recognition part recognizes whether a liquid or powder is in the first object, and
the determination part determines the tilt amount of the first object on the basis of whether a liquid or powder is in the first object.

(20)
The injection apparatus according to any one of (1) to (19),
in which the recognition part recognizes whether a liquid or grain is in the first object, and
the determination part determines the tilt amount of the first object on the basis of whether a liquid or grain is in the first object.

(21)
The injection apparatus according to any one of (1) to (20),
in which the recognition part recognizes whether powder or grain is in the first object, and
the determination part determines the tilt amount of the first object on the basis of whether powder or grain is in the first object.

(22)
The injection apparatus according to any one of (1) to (21), further including:
at least two arms,
in which in a case where the contents are injected from the first object into the second object, the tilt control part holds a lid of the first object by a different arm from an arm gripping and tilting the first object.

(23)
An injection method including:
recognizing a flowrate of contents injected from a first object into a second object by tilting the first object containing the liquid, powder, or grain contents;
determining the tilt amount of the first object on the basis of the recognized flowrate; and
performing tilt control on the first object on the basis of the determined tilt amount.

(24)
An injection program for causing a computer to function as:
a recognition part configured to recognize a flowrate of contents injected from a first object into a second object by tilting the first object containing the liquid, powder, or grain contents;
a determination part configured to determine the tilt amount of the first object on the basis of the recognized flowrate; and
a tilt control part configured to perform tilt control on the first object on the basis of the determined tilt amount.

(25)
An apparatus including:
a robotic arm device configured to grip a first container; and circuitry configured to
  recognize a flowrate of contents while injecting an amount of the contents from the first container into a second container, and
  control a tilt of the first container using the robotic arm device to inject the contents into the second container according to the recognized flowrate of the contents.

(26)
The apparatus according to (25), wherein the flowrate of the contents is recognized by a flowrate sensor as the contents flow out from an outlet of the first container.

(27)
The apparatus according to (25) or (26), wherein the flowrate sensor is removably attached to the first container.

(28)
The apparatus according to any one of (25) to (27), wherein the flowrate of the contents is recognized by a vision sensor as the contents flow out from an outlet of the first container.

(29)
The apparatus according to any one of (25) to (28), wherein the vision sensor recognizes the flowrate of the contents by estimating a width of the contents as the contents flow out from the outlet of the first container.

(30)
The apparatus according to any one of (25) to (29), wherein the circuitry is further configured to determine one or more characteristics related to the contents contained by the first container.

(31)
The apparatus according to any one of (25) to (30), wherein the one or more characteristics related to the contents includes at least one of type, weight, height, or viscosity of the contents.

(32)
The apparatus according to any one of (25) to (31), wherein the one or more characteristics related to the contents includes at least one of weight, radius, or height of the first container.

(33)
The apparatus according to any one of (25) to (32), wherein the circuitry determines a flowrate plan for injecting the amount of the contents from the first container into the second container according to the one or more determined characteristics related to the first container.

(34)
The apparatus according to any one of (25) to (33), wherein the circuitry determines the flowrate plan further according to one or more determined characteristics related to the second container.

(35)
The apparatus according to any one of (25) to (34), wherein the one or more determined characteristics related to the second container includes an amount of contents contained by the second container.

(36)
The apparatus according to any one of (25) to (35),
wherein the one or more determined characteristics related to the contents includes a viscosity of the contents, and
wherein the circuitry estimates the viscosity of the contents by detecting a vibration of the contents in response to a vibration input.

(37)
The apparatus according to any one of (25) to (36), wherein the circuitry estimates the viscosity of the contents by detecting at least one of an amplitude or a phase delay of the vibration of the contents in response to the vibration input.

(38)
The apparatus according to any one of (25) to (37), wherein the at least one of the amplitude or the phase delay of the vibration of the contents is detected by a force sensor.

(39)
The apparatus according to any one of (25) to (38), wherein the force sensor includes a six-axis force sensor.

(40)
The apparatus according to any one of (25) to (39), wherein the force sensor is attached to the robotic arm device.

(41)
A method of controlling a tilt using a robotic arm device, the method including:
causing the robotic arm device to grip a first container;
recognizing a flowrate of contents while injecting an amount of the contents from the first container into a second container; and
controlling a tilt of the first container using the robotic arm device to inject the contents into the second container according to the recognized flowrate of the contents.

(42)
A non-transitory computer-readable storage medium having embodied thereon a program, which when executed by a computer causes the computer to execute a method, the method including:
causing a robotic arm device to grip a first container;
recognizing a flowrate of contents while injecting an amount of the contents from the first container into a second container; and
controlling a tilt of the first container using the robotic arm device to inject the contents into the second container according to the recognized flowrate of the contents.

REFERENCE SIGNS LIST

10 Injection apparatus
11 Measurement part
11a Flowrate sensor
11b Flowmeter
12 Storage part
13 Arm part
131, 132 Arm
131a, 132a Arm part
131b, 132b Grip part
14 Control part
141 Acquisition part
142 Recognition part
143 Planning part
144 Determination part
145 Tilt control part
146 Drive control part
21, 22 Container

The invention claimed is:
1. An apparatus comprising:
a robotic arm device configured to grip a first container from which contents are injected into a second container based on driving of the robotic arm device; and
circuitry configured to
recognize a flowrate of the contents while injecting an amount of the contents from the first container into the second container, and
control a tilt of the first container based on a determined flowrate plan for injecting the amount of the contents using the driving of the robotic arm device to inject the contents into the second container according to the recognized flowrate of the contents,
wherein the flowrate of the contents is recognized by a vision sensor as the contents flow out from an outlet of the first container, and
wherein the flowrate plan for controlling the tilt of the first container is changed according to a speed of the contents recognized by the vision sensor at a time when the contents initially flow out from the outlet of the first container.

2. The apparatus according to claim 1,
wherein the flowrate of the contents is further recognized by a flowrate sensor as the contents flow out from the outlet of the first container.

3. The apparatus according to claim 2,
wherein the flowrate sensor is removably attached to the first container.

4. The apparatus according to claim 1,
wherein the vision sensor recognizes the flowrate of the contents by estimating a width of the contents as the contents flow out from the outlet of the first container.

5. The apparatus according to claim 1,
wherein the circuitry is further configured to determine one or more characteristics related to the contents contained by the first container.

6. The apparatus according to claim 5,
wherein the one or more characteristics related to the contents includes at least one of type, weight, height, or viscosity of the contents.

7. The apparatus according to claim 5,
wherein the one or more characteristics related to the contents includes at least one of weight, radius, or height of the first container.

8. The apparatus according to claim 5,
wherein the circuitry initially determines the flowrate plan for injecting the amount of the contents from the first container into the second container according to the one or more determined characteristics related to the first container.

9. The apparatus according to claim 8,
wherein the circuitry initially determines the flowrate plan further according to one or more determined characteristics related to the second container.

10. The apparatus according to claim 9,
wherein the one or more determined characteristics related to the second container includes an amount of contents contained by the second container.

11. The apparatus according to claim 5,
wherein the one or more determined characteristics related to the contents includes a viscosity of the contents, and
wherein the circuitry estimates the viscosity of the contents by detecting a vibration of the contents in response to a vibration input.

12. The apparatus according to claim 11,
wherein the circuitry estimates the viscosity of the contents by detecting at least one of an amplitude or a phase delay of the vibration of the contents in response to the vibration input.

13. The apparatus according to claim 12,
wherein the at least one of the amplitude or the phase delay of the vibration of the contents is detected by a force sensor.

14. The apparatus according to claim 13, wherein the force sensor comprises a six-axis force sensor.

15. The apparatus according to claim 13, wherein the force sensor is attached to the robotic arm device.

16. A method of controlling a tilt using a robotic arm device, the method comprising:
- causing the robotic arm device to grip a first container from which contents are injected into a second container based on driving of the robotic arm device;
- recognizing a flowrate of the contents while injecting an amount of the contents from the first container into the second container; and
- controlling a tilt of the first container based on a determined flowrate plan for injecting the amount of the contents using the driving of the robotic arm device to inject the contents into the second container according to the recognized flowrate of the contents,
- wherein the flowrate of the contents is recognized by a vision sensor as the contents flow out from an outlet of the first container, and
- wherein the flowrate plan for controlling the tilt of the first container is changed according to a speed of the contents recognized by the vision sensor at a time when the contents initially flow out from the outlet of the first container.

17. A non-transitory computer-readable storage medium having embodied thereon a program, which when executed by a computer causes the computer to execute a method, the method comprising:
- causing a robotic arm device to grip a first container from which contents are injected into a second container based on driving of the robotic arm device;
- recognizing a flowrate of the contents while injecting an amount of the contents from the first container into the second container; and
- controlling a tilt of the first container based on a determined flowrate plan for injecting the amount of the contents using the driving of the robotic arm device to inject the contents into the second container according to the recognized flowrate of the contents,
- wherein the flowrate of the contents is recognized by a vision sensor as the contents flow out from an outlet of the first container, and
- wherein the flowrate plan for controlling the tilt of the first container is changed according to a speed of the contents recognized by the vision sensor at a time when the contents initially flow out from the outlet of the first container.

* * * * *